(12) United States Patent
Sahraei et al.

(10) Patent No.: US 11,812,453 B2
(45) Date of Patent: Nov. 7, 2023

(54) BANDWIDTH-EFFICIENT UTILIZATION OF PEAK REDUCTION TONE RESOURCE

(71) Applicant: QUALCOMM Incorporated, San Diego, CA (US)

(72) Inventors: Saeid Sahraei, San Diego, CA (US); Gokul Sridharan, Sunnyvale, CA (US); June Namgoong, San Diego, CA (US); Krishna Kiran Mukkavilli, San Diego, CA (US); Peter Gaal, San Diego, CA (US); Hwan Joon Kwon, San Diego, CA (US); Hung Dinh Ly, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/320,070

(22) Filed: May 13, 2021

(65) Prior Publication Data

US 2021/0360635 A1    Nov. 18, 2021

Related U.S. Application Data

(60) Provisional application No. 63/025,710, filed on May 15, 2020.

(51) Int. Cl.
*H04L 1/00* (2006.01)
*H04L 27/26* (2006.01)
(Continued)

(52) U.S. Cl.
CPC ........... *H04W 72/53* (2023.01); *H04L 1/0003* (2013.01); *H04L 5/001* (2013.01); *H04L 5/0044* (2013.01);
(Continued)

(58) Field of Classification Search
CPC . H04L 27/2614; H04L 1/0003; H04L 1/0009; H04L 27/2618; H04L 5/0044;
(Continued)

(56) References Cited

U.S. PATENT DOCUMENTS

| 10,193,730 B2 | 1/2019 | Choo et al. |
| 2010/0118836 A1 | 5/2010 | Kazmi et al. |

(Continued)

FOREIGN PATENT DOCUMENTS

EP    2056553 A1    5/2009

OTHER PUBLICATIONS

International Search Report and Written Opinion—PCT/US2021/032592—ISA/EPO—dated Sep. 10, 2021.

*Primary Examiner* — Omar J Ghowrwal
(74) *Attorney, Agent, or Firm* — Haynes and Boone, LLP/Qualcomm Incorporated

(57) ABSTRACT

Wireless communications systems and methods related to bandwidth-efficient utilization of peak reduction tone resource are provided. An example method of wireless communications performed by a user equipment (UE) includes receiving, from a base station in a first subband, a resource allocation indicating a set of transmission tones comprising a set of first data tones, a set of second data tones and a set of peak reduction tones (PRTs). The resource allocation can indicate the set of first data tones overlaps at least a portion of the set of PRTs at respective locations of a set of PRT locations and the set of second data tones is arranged at a set of data tone locations within a particular bandwidth. The UE can communicate, with the base station in a second subband, a data transmission using an outgoing waveform based at least in part on the resource allocation.

30 Claims, 12 Drawing Sheets

(51) Int. Cl.
 *H04L 5/00* (2006.01)
 *H04W 72/53* (2023.01)
 *H04W 72/0453* (2023.01)
 *H04W 72/23* (2023.01)

(52) U.S. Cl.
 CPC ...... *H04L 27/2614* (2013.01); *H04L 27/2618* (2013.01); *H04W 72/0453* (2013.01); *H04W 72/23* (2023.01); *H04L 1/0009* (2013.01)

(58) Field of Classification Search
 CPC .. H04L 5/001; H04W 72/53; H04W 72/0453; H04W 72/23
 See application file for complete search history.

(56) References Cited

U.S. PATENT DOCUMENTS

| | | | |
|---|---|---|---|
| 2010/0124293 | A1 | 5/2010 | Rajagopal |
| 2018/0048436 | A1* | 2/2018 | Park ................... H04W 52/146 |
| 2021/0167889 | A1* | 6/2021 | Yang .................... H04L 5/0053 |
| 2021/0212072 | A1* | 7/2021 | Lee ...................... H04L 5/0051 |
| 2021/0326726 | A1* | 10/2021 | Wang ..................... G06N 3/084 |
| 2021/0344536 | A1* | 11/2021 | Sahraei ............... H04L 27/2618 |
| 2021/0344537 | A1* | 11/2021 | Sahraei ................ H04L 5/0094 |
| 2021/0344544 | A1* | 11/2021 | Sahraei ............... H04L 27/2618 |

\* cited by examiner

BANDWIDTH-EFFICIENT UTILIZATION OF PEAK REDUCTION TONE RESOURCE

CROSS-REFERENCE TO RELATED APPLICATIONS

The present application claims priority to and the benefit of the U.S. Provisional Patent Application No. 63/025,710, filed May 15, 2020, titled "Bandwidth-Efficient Utilization of Peak Reduction Tone Resource," which is incorporated by reference herein in its entirety as if fully set forth below and for all applicable purposes.

TECHNICAL FIELD

This application relates to wireless communication systems, and more particularly to techniques in bandwidth-efficient utilization of peak reduction tone resource.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP). A wireless multiple-access communications system may include a number of base stations (BSs), each simultaneously supporting communication for multiple communication devices, which may be otherwise known as UE.

To meet the growing demands for expanded mobile broadband connectivity, wireless communication technologies are advancing from the LTE technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The above multiple access technologies have been adopted in various telecommunication standards to provide a common protocol that enables different user equipment to communicate on a municipal, national, regional, and even global level. NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communications performed by a wireless communication device includes receiving, from a base station in a first subband of a plurality of subbands, a resource allocation indicating a set of transmission tones comprising a set of first data tones, a set of second data tones and a set of peak reduction tones (PRTs), in which the resource allocation indicates the set of first data tones overlaps at least a portion of the set of PRTs at respective locations of a set of PRT locations and the set of second data tones is arranged at a set of data tone locations within a particular bandwidth; and communicating, with the base station in a second subband of the plurality of subbands, a data transmission using an outgoing waveform based at least in part on the resource allocation.

In an additional aspect of the disclosure, a user equipment for wireless communication includes a transceiver configured to receive, from a base station in a first subband of a plurality of subbands, a resource allocation indicating a set of transmission tones comprising a set of first data tones, a set of second data tones and a set of peak reduction tones (PRTs), in which the resource allocation indicates the set of first data tones overlaps at least a portion of the set of PRTs at respective locations of a set of PRT locations and the set of second data tones is arranged at a set of data tone locations within a particular bandwidth. The transceiver is also configured to communicate, with the base station in a second subband of the plurality of subbands, a data transmission using an outgoing waveform based at least in part on the resource allocation.

In an additional aspect of the disclosure, a method of wireless communication performed by a base station, comprising: transmitting, to a user equipment in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and receiving, with the user equipment in a second subband of the plurality of subbands, a data transmission using an outgoing waveform based at least in part on the resource allocation.

In an additional aspect of the disclosure, a base station (BS) for wireless communications, comprises: a transceiver configured to: transmit, to a user equipment in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and receive, with the user equipment in a second subband of the plurality of subbands, a data transmission using an outgoing waveform based at least in part on the resource allocation.

Other aspects, features, and instances of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features also may be used in accordance with the various aspects of the disclosure discussed herein. In similar fashion, while exemplary aspects may be discussed below as user equipment, apparatus, system, or method aspects it should be understood that such exemplary aspects can be implemented in various devices, systems, and methods.

DETAILED DESCRIPTION

Figure 1:
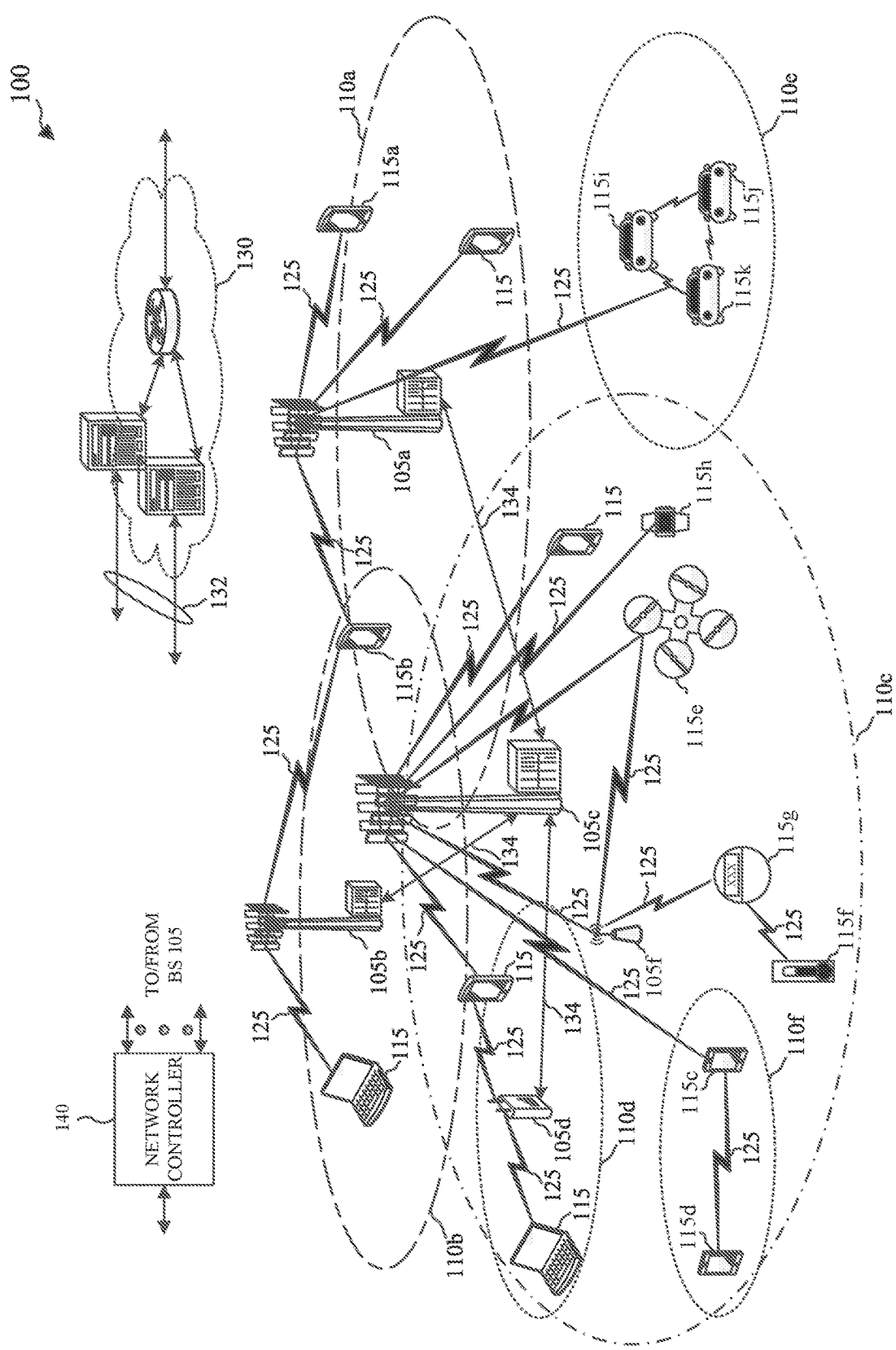
FIG. 1 illustrates a wireless communication network according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (WI-FI), IEEE 802.16 (WIMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G NR networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Commercial power amplifiers typically have a non-linear behavior if operated at high input power. This non-linearity may result in in-band and out-of-band distortion of the signal, and degraded error vector magnitude (EVM) at a receiver of the signal. To avoid non-linearity, the power amplifier may be operated at a mean input power that is several dB lower than the saturation point. If a signal has a peak-to-average power ratio (PAPR) of x dB, an input backoff (IBO) of x dB may be used to avoid the non-linearity even at the peak of the input signal. In one example, providing the IBO at a significantly greater value than the PAPR causes underutilization of the power amplifier, causing the transmitter to transmit at less than full power. In another example, if the IBO is significantly smaller than the PAPR, the power amplifier is driven into saturation and the signal at the receiver becomes distorted. In some aspects, an appropriate power level may be determined by determining an input power that maintains the PAPR of the signal below a certain level.

OFDM signals are known to suffer from significant PAPR that grows rapidly by the size of the frequency block. 5G NR is being developed to support higher data rates than LTE. Thus, 5G NR OFDM block sizes may be larger than LTE block sizes, thereby further increasing PAPR of signals. Some PAPR reduction techniques may be data-dependent and computationally expensive, making them unfit for a real-time implementation in the context of a 5G NR transmitter. As a result, clipping and filtering (CF) techniques are often used in the industry. CF results in in-band distortion and often does not converge to a desirable solution.

5G NR provides an abundance of bandwidth both in the uplink and downlink. This is true both due to the addition of Frequency Range 2 (FR2) in 5G NR as well as an increase in the available bandwidth to 100 MHz in the Sub-6 GHz frequency range. This excess bandwidth is partially exploited by using longer OFDM symbols, which further increases the PAPR for OFDM. The excess bandwidth may also be exploited for PAPR reduction via a technique known as tone reservation.

Tone reservation may allow a transmitter to utilize some of the otherwise-idle tones (or subcarriers) for reducing the PAPR of an OFDM signal. The magnitude and the phase of the reserved tones may be optimized for a given OFDM symbol to minimize the PAPR of the associated signal. In some cases, there may be no overlap between the data tones and reserved tones. In this way, tone reservation may be used without introducing any EVM or adjacent channel leakage ratio (ACLR). The receiver may simply ignore the portion of the signal associated with the reserved tones and only decode the portion of the signal associated with the data tones.

Tone reservation may be performed by determining peak reduction tones (PRTs) that are configured to reduce peaks of the resulting OFDM signal so that the PAPR of the resulting OFDM signal satisfies a threshold. PRTs may be generated using a signal-to-clipping noise ratio tone reservation (SCR-TR) algorithm. The SCR-TR algorithm may be used to optimize the value of PRT tones based at least in part on their locations.

A UE may be allocated a set of N transmission tones having a corresponding set of tone location indices, $\{1, \ldots, N\}$. If $\Phi$ is a subset of $\{1, \ldots, N\}$ corresponding to the PRT locations, the remaining transmission tone locations may be allocated to data tones, having a subset, $\{1, \ldots, N\}\setminus\Phi$, of tone location indices. A frequency domain kernel, $P_i$, may be constructed such that:

$$P_i = \begin{cases} 1 & \text{if} \quad i \in \Phi \\ 0 & \text{if} \quad i \in [N]\setminus\Phi \end{cases} \quad \text{Eq. (1)}$$

and p=iDFT(P). X may be the frequency domain data. Thus, $X_i$=0, if i∈Φ and x=iDFT(X).

According to the SCR-TR algorithm, the location of the largest peak of x is identified, and the index thereof represented by j∈[LN], where L is the oversampling factor. The SCR-TR includes circularly shifting p, p$^j$=circshift(p,j), so that the peaks are aligned. The SCR-TR further includes subtracting the scaled and shifted p from x to obtain:

$$x_{new} = x - \frac{|x(j)| - \mu}{p(0)} p_j e^{j \angle x(j)}, \quad \text{Eq. (2)}$$

where y is the target peak, <x(j) is the phase of x(j), i= $\sqrt{-1}$. This process is iterated several times to reduce several peaks. The time-domain kernel p has a single prominent and narrow peak if the number of reserved tones is sufficiently large and the locations are chosen properly. Additionally, circularly shifting p in the time-domain does not impact the location of PRTs in the frequency domain—it only disturbs their phase.

As discussed above, OFDM signals incur a high PAPR that results in inefficient use of power amplifiers. If the power amplifier is pushed to the saturation point, the high PAPR of CP-OFDM waveforms results in high EVM and ACLR at a receiver. On the other hand, if the power amplifier is under-utilized, the transmitter may not transmit at full power. Therefore, it is desirable to reduce the PAPR of OFDM symbols before feeding the OFDM symbols to the power amplifier. Tone reservation is a known technique to reduce PAPR. As discussed above, this technique allows the transmitter to utilize some of the idle tones to cancel out the peaks in the time domain. However, the peak reduction tones are typically considered wasted resources that are used for the purpose of PAPR reduction and not for data transmissions.

The subject technology provides for the UE to transmit data tones interleaved with peak reduction tones, where a first subset of data tones is interleaved with peak reduction tones and a second subset of data tones is overlapped with the peak reduction tones by modulating the overlapping data tones with a different order modulation scheme than that of non-overlapping data tones. The subject technology also provides for signaling aspects that enable the UE and a base station (e.g., gNB) to coordinate on the use of the PRTs and the selection of the modulation scheme for both data tones and PRTs.

By having certain sets of data tones overlapped with sets of peak reduction tones, the spectral efficiency can be improved while maintaining EVM values within an acceptable range for each range of tones. By having the location of the PRT fixed in advance, the complexity of the transmitter is significantly improved since the optimization may not be performed in real time. While the magnitude and phase of the reserved tones may be adjusted for each symbol, PRTs have universally beneficial index allocation.

Various aspects are described herein in connection with a wireless communication device. A wireless communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Various other aspects and features of the disclosure are further described below. It should be apparent that the teachings herein may be embodied in a wide variety of forms and that any specific structure, function, or both being disclosed herein is merely representative=and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to aspects of the present disclosure. The network 100 includes BSs 105, UEs 115, and a core network 130. In some instances, the network 100 operates over a shared spectrum. The shared spectrum may be unlicensed or partially licensed to one or more network operators. Access to the spectrum may be limited and may be controlled by a separate coordination entity. In some instances, the network 100 may be a 5G NR network. In other instances, the network 100 may be a LTE or LTE-A network. In yet other instances, the network 100 may be a millimeter wave (mmW) network, a 5G NR network, a 5G+ network, an ultra-wideband (UWB) network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 also may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. In one aspect, a UE 115 may be a device that includes a Universal Integrated Circuit Card (UICC). In another aspect, a UE may be a device that does not include a UICC. In some aspects, the UEs 115 that do not include UICCs also may be referred to as IoT devices or internet of everything (IoE) devices. The UEs 115a-115d are examples of mobile smart phone-type devices accessing network 100. In one aspects, UEs 115c and 115d are in communication with one another through sidelink transmissions between the UEs 115c and 115d in a coverage area 110f. A UE 115 also may be a machine specifically configured for connected communication, including machine type communication (MTC), enhanced MTC (eMTC), narrowband IoT (NB-IoT) and the like. MTC and eMTC UEs include, for example, robots, drones, remote devices, sensors, meters, monitors, location tags, etc., which may communicate with a base station, another device (e.g., remote device), or some other entity. A UE 115 may be considered a Customer Premises Equipment (CPE). The UE 115 may be included inside a housing that houses components of UE 215, such as processor components, memory components, and/or the like. The UEs 115e-115h are examples of various machines configured for communication that access the network 100. The UEs 115i-115k are examples of vehicles in coverage area 110e that are equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

The network 100 may also support mission critical communications with ultra-reliable and redundant links for mission critical devices, such as the UE 115e, which may be a drone. Redundant communication links with the UE 115e may include links from the macro BS 105c, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105c, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and the BS 105a.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth also may be partitioned into subbands.

In an instance, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into min-slots, as described in greater detail herein. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In some aspects, the network 100 may be an 5G NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an instance, a UE 115 attempting to access the network 100 may perform an initial cell search by detecting a primary synchronization signal (PSS) from a BS 105. The PSS may enable synchronization of period timing and may indicate a sector identity value (e.g., 0, 1, 2, etc.). The UE 115 may then receive a secondary synchronization signal (SSS). The SSS may enable radio frame synchronization, and may provide a cell identity value, which may be combined with the PSS identity value to identify the physical cell identity. The SSS may also enable detection of a duplexing mode and a cyclic prefix length. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105.

After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WI-FI, and/or licensed-assisted access (LAA).

In some instances, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

In an instance, the network 100 may support multiple networks with different RAT technologies. For example, the network 100 may be initially deployed as an LTE network and subsequently add advanced RAT technologies such as 5G NR to provide improved network functionalities, such as lower latency, greater bandwidth, and/or higher throughput. Mechanisms for deploying an 5G NR network within an LTE network are described in greater detailer herein.

In various instances, the UE 115 includes a transceiver configured to acquire, from a first serving cell (e.g., 105c) associated with a first wireless communication network, a frequency list in system information. The UE 115 also includes a processor configured to determine a first frequency band supported by the first serving cell (e.g., 105c) and a second frequency band supported by one or more second serving cells (e.g. 105b) for dual connectivity with the first wireless communication network and a second wireless communication network, from the frequency list. The UE 115 may be adapted to determine whether the first serving cell (e.g., 105c) supports dual connectivity using a band-frequency combination supported by the UE 115 based on the first frequency band and the second frequency band. The UE 115 also includes a user interface configured to provide, for display on a display device of the UE 115, a first indication of a first service associated with the one or more second serving cells (e.g., 105b), when the first serving cell (e.g., 105c) supports the dual connectivity using the band-frequency combination supported by the UE 115.

Figure 2:
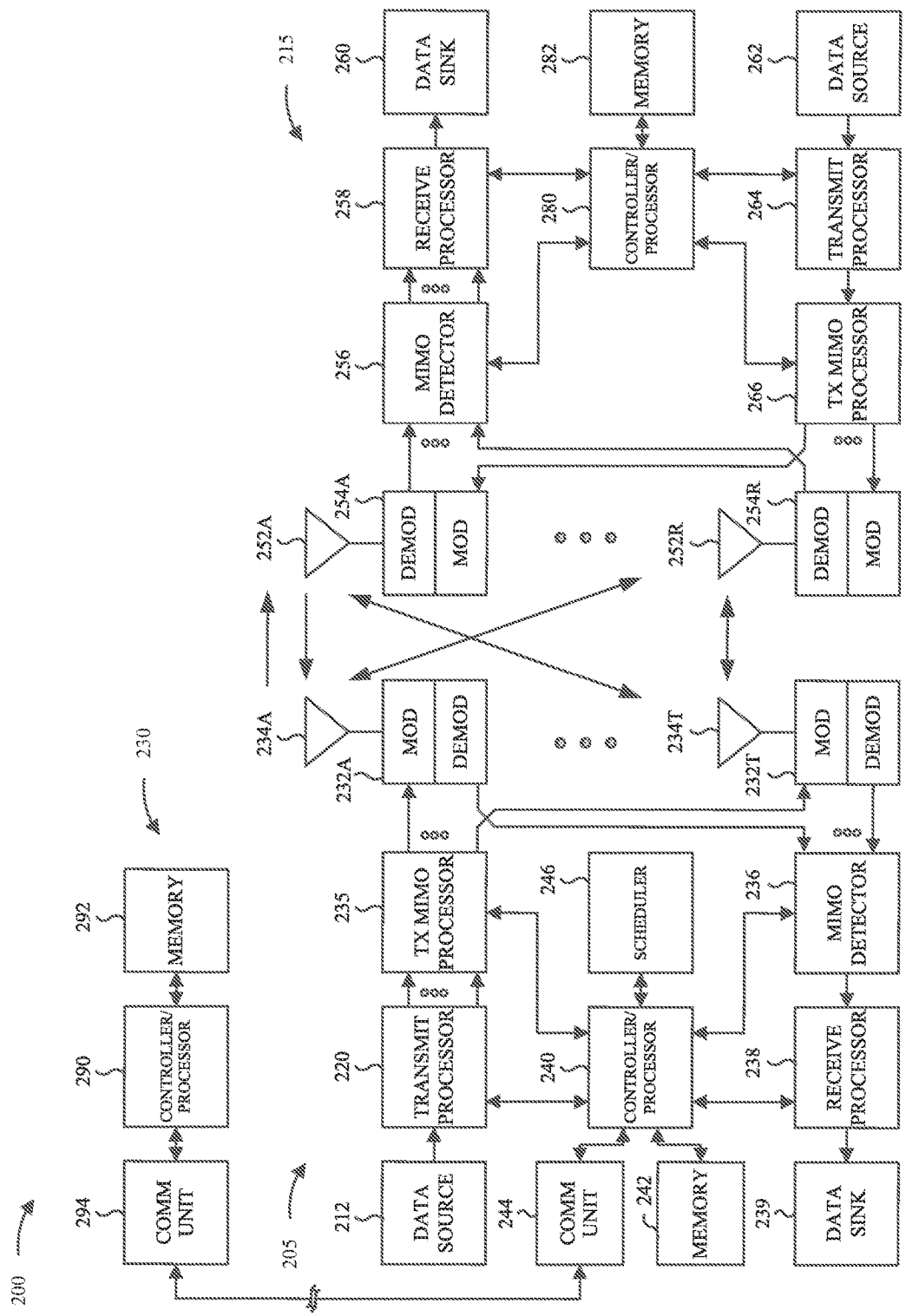
FIG. 2 illustrates a block diagram conceptually illustrating an example of a base station in communication with a UE in a wireless communication network according to aspects of the present disclosure.

FIG. 2 illustrates a block diagram conceptually illustrating an example of a base station 205 in communication with a UE 215 in a wireless communication network 200 according to aspects of the present disclosure. The UE 215 may be a UE 115 in the network 100 as discussed above in FIG. 1, and the BS 205 maybe BS 105 in the network 100 as discussed above in FIG. 1. The BS 205 may be equipped with T antennas 234a through 234t, and UE 215 may be equipped with R antennas 252a through 252r, where in general T≥1 and R≥1.

At BS 205, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 235 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 215, antennas 252a through 252r may receive the downlink signals from BS 205 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 215 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 215 may be included in a housing.

On the uplink, at UE 215, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 205. At BS 205, the uplink signals from UE 215 and other UEs may be received by antennas 234, processed by demodulators 254, detected by a MIMO detector 236 if applicable, and further processed by a receive processor 238 to obtain decoded data and control information sent by UE 215. Receive processor 238 may provide the decoded data to a data sink 239 and the decoded control information to controller/processor 240. Base station 205 may include communication unit 244 and communicate to network controller 230 via communication unit 244. Network controller 230 may include communication unit 294, controller/processor 290, and memory 292.

Controller/processor 240 of BS 205, controller/processor 280 of UE 215, and/or any other component(s) of FIG. 2 may perform one or more techniques associated with tone reservation for PAPR reduction, as described in more detail elsewhere herein. For example, controller/processor 240 of BS 205, controller/processor 280 of UE 215, and/or any other component(s) of FIG. 2 may perform or direct operations of, for example, process 800 of FIG. 8, process 900 of FIG. 9, and/or other processes as described herein. Memories 242 and 282 may store data and program codes for BS 205 and UE 215, respectively. A scheduler 246 may schedule UEs for data transmission on the downlink and/or uplink.

Figure 8:
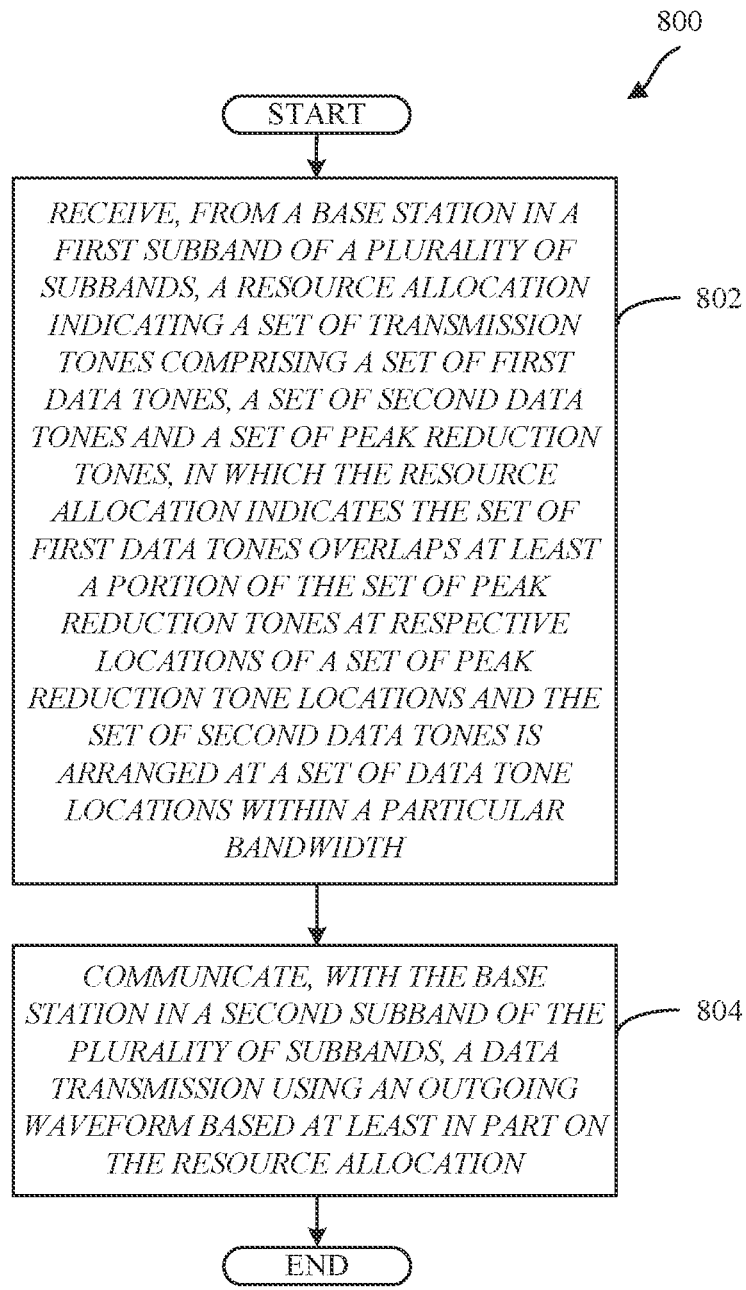
FIG. 8 illustrates a flow diagram of an exemplary process of allocating peak reduction tones with overlapping data tones according to aspects of the present disclosure.

The stored program codes, when executed by processor 280 and/or other processors and modules at UE 215, may cause the UE 215 to perform operations described with respect to process 800 of FIG. 8 and/or other processes as described herein. The stored program codes, when executed by processor 240 and/or other processors and modules at BS 205, may cause the BS 205 to perform operations described with respect to process 1000 of FIG. 10 and/or other processes as described herein.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

In some aspects, the UE 215 may transmit data tones interleaved with peak reduction tones, where a first subset of data tones is interleaved with peak reduction tones and a second subset of data tones is overlapped with the peak reduction tones by modulating the overlapping data tones with a different order modulation scheme than that of non-overlapping data tones. Additionally, specific PRT signaling can be exchanged between the UE 215 and BS 205 to enable the UE 215 and the BS 205 to coordinate on the use of the PRTs and the selection of the modulation scheme for both data tones and PRTs. By having certain data tones overlapped with the peak reduction tones, the spectral efficiency of PRT bandwidth utilization can be improved while maintaining EVM values within an acceptable range for each range of tones.

Figure 3:
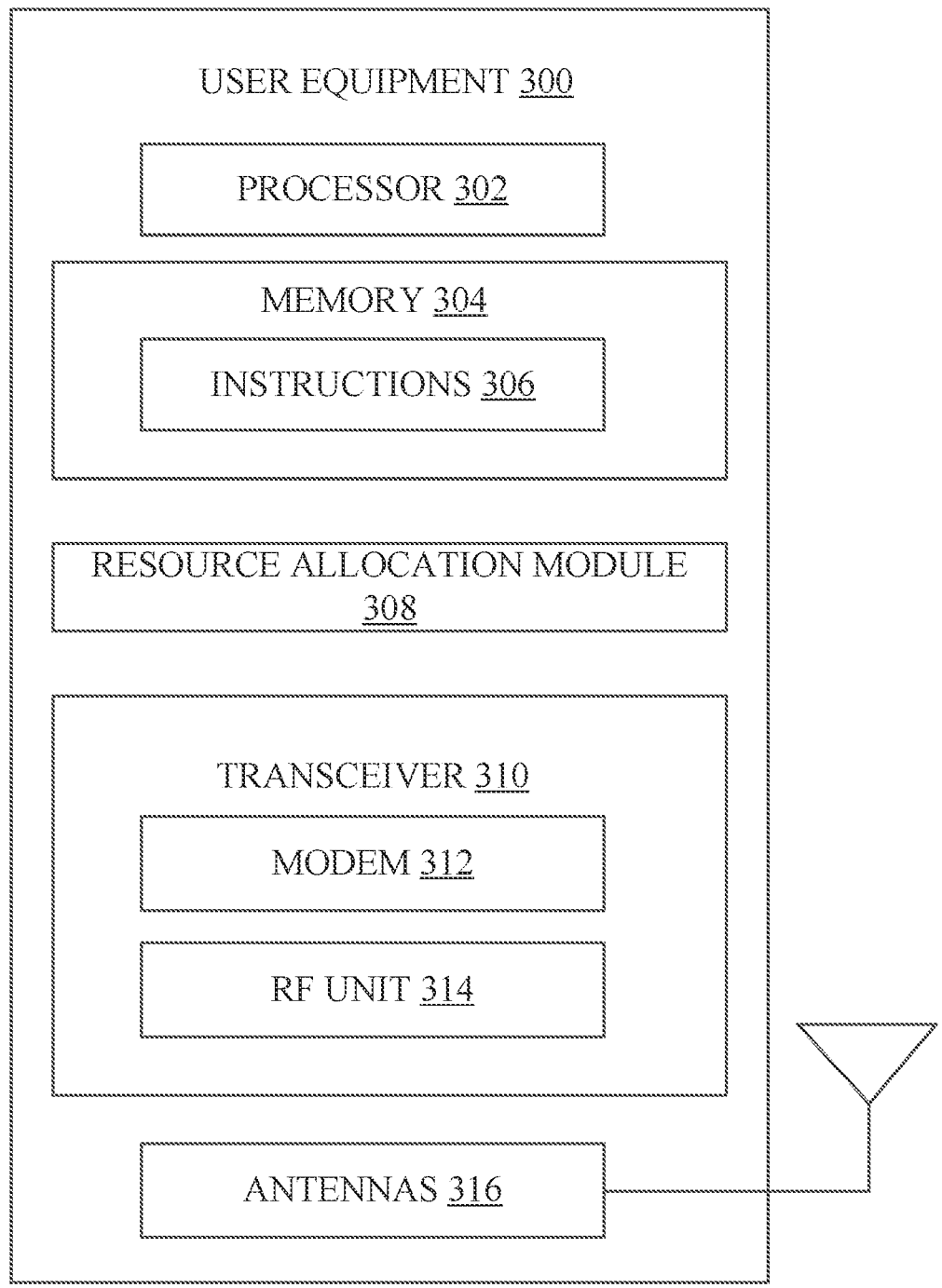
FIG. 3 illustrates a block diagram of an exemplary user equipment (UE) according to aspects of the present disclosure.

FIG. 3 illustrates a block diagram of an exemplary UE 300 according to aspects of the present disclosure. The UE 300 may be a UE 115 in the network 100 as discussed above in FIG. 1 or a UE 215 in the network 200 as discussed above in FIG. 2. As shown, the UE 300 may include a processor 302, a memory 304, a resource allocation module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 also may be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with aspects of the present disclosure. Instructions 306 also may be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312, and/or the RF unit 314 may be separate devices that are coupled together at the UE 300 to enable the UE 300 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs to sustain multiple transmission links. The RF unit 314 may configure the antennas 316.

The resource allocation module 308 may be adapted to receive, a resource allocation that indicates a set of transmission tones having a set of first data tones, a set of second data tones and a set of PRTs. The resource allocation module 308, in coordination with the transceiver 310, may receive the resource allocation by receiving one or more PDCCHs of the plurality of PDCCHs. The resource allocation module 308, in coordination with the modem 312, may decode the one or more PDCCHs to recover downlink control information (DCI) in the one or more PDCCHs of the plurality of PDCCHs. In other aspects, the resource allocation module 308, in coordination with the transceiver 310, may receive the resource allocation in a medium access control (MAC) control element (MAC-CE). In still other aspects, the resource allocation module 308, in coordination with the transceiver 310, may receive the resource allocation 502 in a radio resource control (RRC) message.

The modem 312 may be adapted to may decode the DCI to recover the PRTT. The resource allocation module 308, in coordination with the modem 312, may obtain an indication of one or more entries in the PRTT that includes the PRT sequence, from the DCI. The resource allocation module 308, in coordination with the modem 312, may acquire the PRT sequence from the one or more entries in the PRTT. The resource allocation module 308 may obtain an indication of one or more entries in the PRTT that includes the PRT sequence, from the DCI. As such, the resource allocation module 308 may acquire the PRT sequence from the one or more entries in the PRTT. In other aspects, the resource allocation module 308 may obtain an indication of one or more entries in the PRTT that includes one or more parameters to the deterministic function, from the DCI. In this respect, the processor 402, in coordination with the resource allocation module 308, may generate the PRT sequence using the deterministic function with the one or more parameters. In some aspects, the deterministic function includes at least one of a Golomb ruler, a Costas array, a Gold sequence, or a linear function. In some aspects, the resource allocation module 308, in coordination with the transceiver 310, may receive, from the BS 105, the PRT sequence that indicates which tones in the set of transmission tones are designated as the set of PRTs.

In some aspects, the resource allocation module 308, in coordination with the modem 312, may determine that the set of first data tones corresponds to a first order modulation scheme and the set of second data tones corresponds to a second order modulation scheme having an order greater than the first order modulation scheme based on the PRT sequence. The resource allocation module 308 may infer a modulation scheme for the set of first data tones by determining the first order modulation scheme for the set of first data tones based on at least a portion of the second order modulation scheme. In some aspects, the resource allocation module 308, in coordination with the processor 302, may determine that the set of first data tones corresponds to a first transmission power and the set of second data tones corresponds to a second transmission power that is lesser than the first transmission power based on at least the first MCS that corresponds to the set of first data tones. In some aspects, the resource allocation module 308, in coordination with the processor 302, may determine that the set of first data tones corresponds to a first transmission power and the set of second data tones corresponds to a second transmission power based on one or more entries in the PRTT. In some aspects, the resource allocation module 308, in coordination with the transceiver 310, may receive, from the BS 105, a request to assign different transmission power to the set of first data tones and the set of second data tones when the second order modulation scheme is equivalent to the first order modulation scheme. In this respect, the resource allocation module 308, in coordination with the processor 302, may assign the first transmission power to the set of first data tones 526 and the second transmission power to the set of second data tones based on the request.

The RF unit 314, in coordination with the resource allocation module 308, may be adapted to transmit a data transmission 518 that includes an outgoing waveform based at least in part on the resource allocation. In some aspects, the RF unit 314 may communicate the data transmission with the BS 105 in a second subband of the plurality of subbands, In some aspects, the second subband includes a plurality of PUSCHs multiplexed in at least one of time or frequency. In this respect, the RF unit 314 may transmit, to the BS 105, the data transmission in one or more PUSCHs of the plurality of PUSCHs. In some aspects, the RF unit 314 may transmit the data transmission with the first transmission power corresponding to the set of first data tones and the second transmission power corresponding to the set of second data tones.

Figure 4:
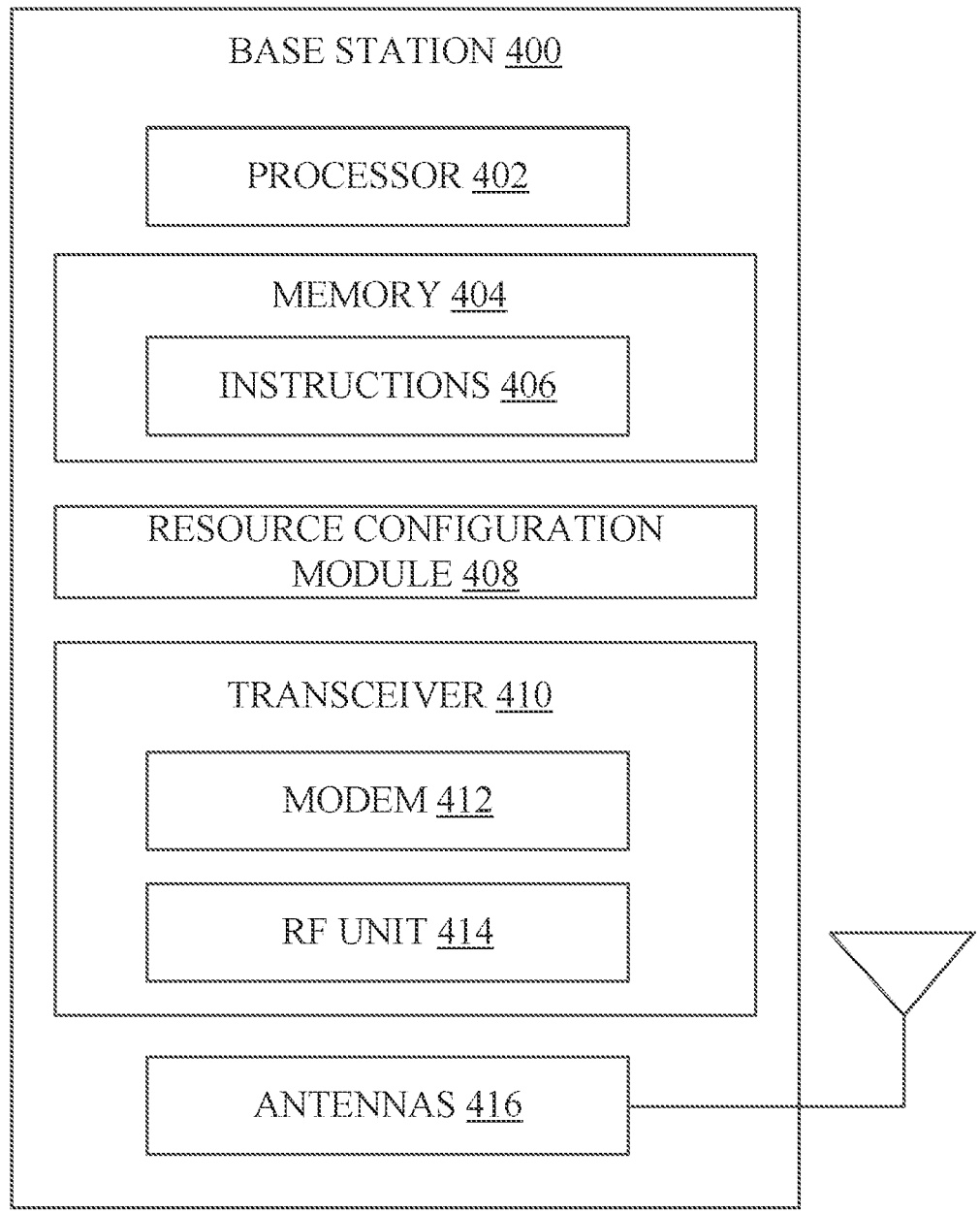
FIG. 4 illustrates a block diagram of an exemplary base station (BS) according to aspects of the present disclosure.

FIG. 4 illustrates a block diagram of an exemplary BS 400 according to some aspects of the present disclosure. The BS 400 may be a BS 105 in the network 100 as discussed above in FIG. 1 or a BS 205 in the network 200 as discussed above in FIG. 2. As shown, the BS 400 may include a processor 402, a memory 404, a resource configuration module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 also may be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1, 2, and 5-10. Instructions 406 also may be referred to as code, which may be interpreted broadly to include any type of computer-readable statement(s) as discussed above with respect to FIG. 4.

The resource configuration module 408, in coordination with the processor 402, may be adapted to perform a noise estimation for a set of first data tones that corresponds to data tone with a first order MCS modulation based at least in part on a configuration that assigns the UE to utilize a set of PRTs at fixed locations within a particular bandwidth for reducing PAPR peaks of one or more OFDM symbols while the UE adhere to an assigned power constraint for the set of first data tones.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115, UE 215 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115, 215 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., RRC connection complete, RRC connection reconfiguration complete) to the processor 402 for processing. The antennas 416 may include multiple antennas of similar or different designs in order to sustain multiple transmission links.

The transceiver 410, in coordination with the resource configuration module 408 and the RF unit 414, may be adapted to communicate, with the UE in a first subband of a plurality of subbands, a resource allocation indicating a set of transmission tones that includes a set of first data tones, a set of second data tones and a set of peak reduction tones. In some aspects, the resource allocation indicates the set of first data tones overlaps at least a portion of the set of PRTs at respective locations of a set of PRT locations and the set of second data tones is arranged at a set of data tone locations within a particular bandwidth. The transceiver 410 also may be adapted to receive, from the UE in a second subband of the plurality of subbands, a data transmission that includes an incoming waveform based at least in part on the resource allocation.

In an aspect, the BS 400 can include multiple transceivers 410 implementing different RATs (e.g., 5G NR and LTE). In an aspect, the BS 400 can include a single transceiver 410 implementing multiple RATs (e.g., 5G NR and LTE). In an aspect, the transceiver 410 can include various components, where different combinations of components can implement different RATs.

Figure 5:
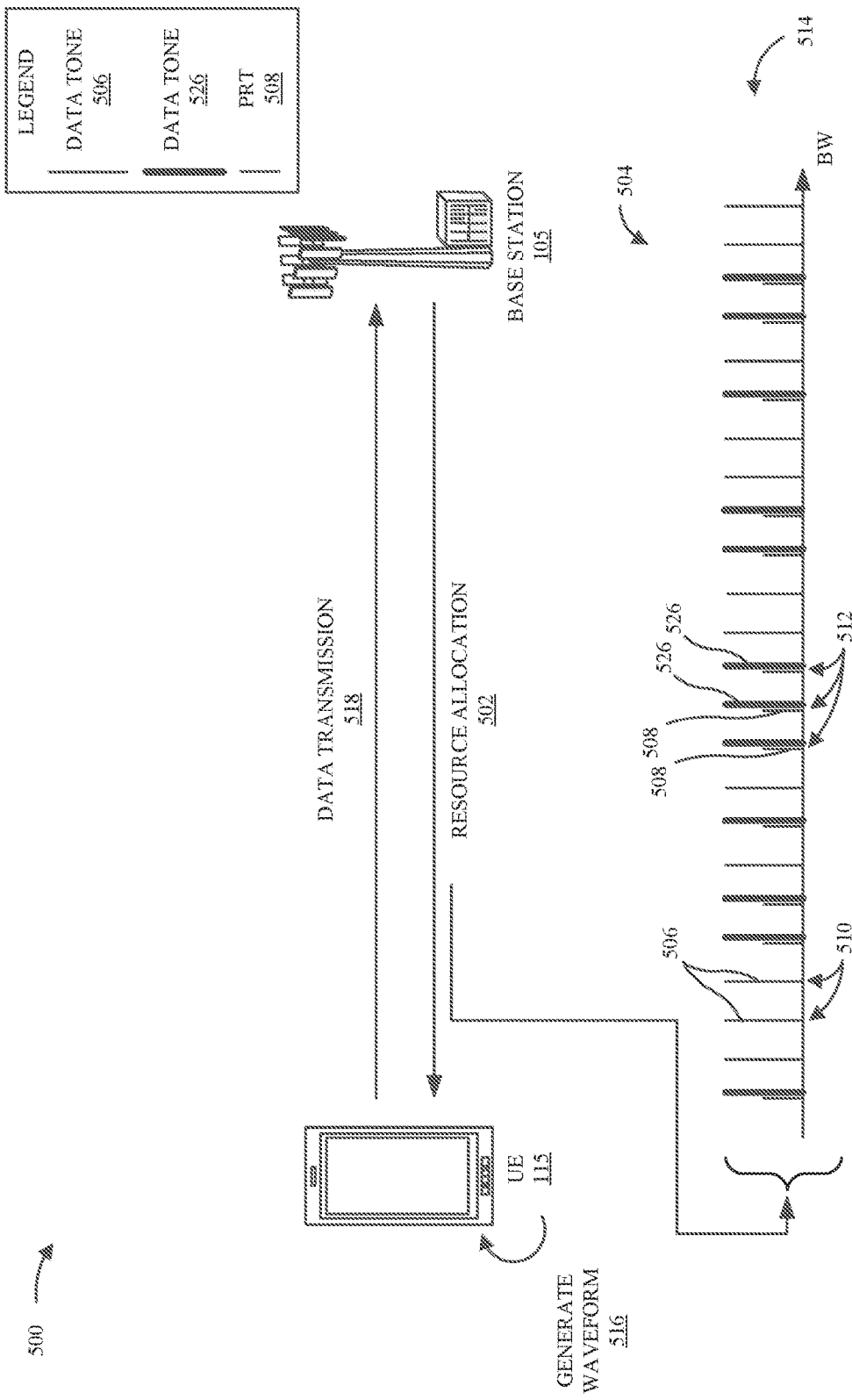
FIG. 5 illustrates a simplified diagram of an example of tone reservation with peak reduction tones and overlapping data tones, in accordance with various aspects of the present disclosure.

FIG. 5 illustrates a diagram illustrating an example of tone reservation with peak reduction tones and overlapping data tones, in accordance with various aspects of the present disclosure. As shown, a BS 105 and a UE 115 may communicate with one another.

The BS 105 may transmit, and the UE 115 may receive, a resource allocation 502. The resource allocation 502 may indicate a set of transmission tones 504. The set of transmission tones 504 may include a set of first data tones 526 (depicted by the longer thick vertical bars), a set of second data tones 506 (depicted by the longer thin vertical bars) and a set of PRTs 508 (depicted by the shorter vertical bars). The resource allocation 502 may indicate a set of data tone locations 510 within a particular bandwidth (depicted as "BW"). The resource allocation 502 may indicate a set of PRT locations 512 within the particular bandwidth. In some aspects, the set of PRT locations 512 may be arranged relative to the set of data tone locations 510 according to a PRT sequence 514. As shown, the PRT sequence 514 may include PRTs 508 interleaved with set of second data tones 506.

In some aspects, the resource allocation 502 indicates the set of first data tones 526 overlaps at least a portion of the set of PRTs 508 at respective locations of the set of PRT locations 512 and the set of second data tones 506 is arranged at the set of data tone locations 510 within the particular bandwidth. In various instances, the set of first data tones 526 is arranged non-overlapping with the set of second data tones 506. In some instances, the set of first data tones 526 partially overlaps the set of PRTs 508. In one instance, the set of first data tones 526 overlaps the set of PRTs 508 in its entirety. In various instances, each second data tone in the set of second data tones 506 is arranged non-overlapping with the set of PRTs 508. In one instance, the set of second data tones 506 partially overlaps the set of PRTs 508 by a first overlap amount. In various instances, the set of first data tones 526 overlaps at least in part the set of PRTs 508 by at least a second overlap amount. In various instances, the second overlap amount is greater than the first overlap amount.

In some aspects, the resource allocation 502 may be carried in downlink control information (DCI), a radio resource control (RRC) message, a medium access control (MAC)-control element (CE), and/or the like. In various aspects, the UE 115 receives the resource allocation 502 from BS 105 in a first subband of a plurality of subbands. In some aspects, the first subband includes a plurality of subcarriers (or a plurality of tones). In various instances, the first subband includes a plurality of PDCCHs multiplexed in at least one of time or frequency. The UE 115 may receive the resource allocation 502 by receiving one or more PDCCHs of the plurality of PDCCHs. The UE 115 may decode the one or more PDCCHs to recover downlink control information (DCI) in the one or more PDCCHs of the plurality of PDCCHs. In some instances, the DCI includes a frequency domain resource assignment for the UE 115 that includes the resource allocation 502. In other aspects, the UE 115 may receive the resource allocation 502 in a radio resource control (RRC) message from the BS 105. In still other aspects, the UE 115 may receive the resource allocation 502 in a medium access control (MAC) control element (MAC-CE) from the BS 105.

In some aspects, the resource allocation 502 may indicate the PRT sequence 514 by referencing a PRT table (PRTT) associated with the resource allocation 502. In some aspects, the PRTT may indicate a plurality of PRT sequences. In some aspects, the UE 115 may decode the DCI to recover the PRTT. The UE 115 may obtain an indication of one or more entries in the PRTT that includes the PRT sequence 514, from the DCI. The UE 115 may acquire the PRT sequence 514 from the one or more entries in the PRTT. In some aspects, the PRTT provides predetermined PRT locations for the set of PRT locations 512 with the PRT sequence 514. In some aspects, the set of PRT locations 512 is arranged relative to the set of data tone locations 510 according to the PRT sequence 514.

In some aspects, the PRTT may include a plurality of entries. An entry of the plurality of entries may include the PRT sequence 514, one or more parameters of a deterministic function, and/or the like. In some aspects, the UE 115 obtain an indication of one or more entries in the PRTT that includes one or more parameters to the deterministic function, from the DCI. In some aspects, the plurality of entries may indicate a plurality of deterministic functions. Each entry of the plurality of entries may correspond to a respective deterministic function of the plurality of deterministic functions. In some aspects, the UE 115 generates the PRT sequence 514 using the deterministic function with the one or more parameters. In some aspects, the deterministic function includes at least one of a Golomb ruler, a Costas array, a Gold sequence, or a linear function. The deterministic function may provide predetermined PRT locations for the set of PRT locations 512 with the PRT sequence 514. In some aspects, the UE 115 may determine that the set of first data tones 526 corresponds to a first transmission power and the set of second data tones 506 corresponds to a second transmission power based on one or more entries in the PRTT. In receiving the resource allocation 502, the UE 115 may receive, from the BS 105, the PRT sequence 514 that indicates which tones in the set of transmission tones 504 are designated as the set of PRTs 508.

In some aspects, the set of first data tones 526 includes first data tones that correspond to a first order modulation scheme and the set of second data tones 506 includes second data tones that correspond to a second order modulation scheme. In various instances, the second order modulation scheme is different from the first order modulation scheme. For example, the second order modulation scheme has a higher order than the first order modulation scheme. In one example, the first order modulation scheme includes a quadrature phase shift keying (QPSK) modulation and the second order modulation scheme includes a 256-bit quadrature amplitude modulation (256-QAM) modulation, although other modulation schemes may be implemented without departing from the scope of the present disclosure. In some instances, the second order modulation scheme is equivalent to the first order modulation scheme. In some aspects, the UE 115 may determine that the set of first data tones 526 corresponds to the first order modulation scheme based on the PRT sequence 514. In some aspects, the PRT sequence 514 indicates the set of second data tones 506 corresponds to the second order modulation scheme that has an order greater than that of the first order modulation scheme.

In receiving the resource allocation 520, the UE 115 may receive, from the BS 105, MCS information for the set of transmission tones 504. In some aspects, the MCS information may include a second MCS for the set of second data tones 506. As such, the UE 115 may infer a modulation scheme for the set of first data tones 526 by determining a first MCS for the set of first data tones 526 based on at least a portion of the second MCS. In other aspects, the MCS information may include a first MCS for the set of first data tones 526 and a second MCS for the set of second data tones 506, in which the second MCS has a greater order than that of the first MCS. In some aspects, the UE 115 may determine that the set of first data tones 526 corresponds to a first transmission power and the set of second data tones 506 corresponds to a second transmission power that is lesser than the first transmission power based on at least the first MCS that corresponds to the set of first data tones 526.

In some aspects, the UE 115 may assign a first transmission power to the set of first data tones 526 and a second transmission power to the set of second data tones 506. In various instances, the first transmission power is greater than the second transmission power in the data transmission to help prevent significant distortion to the set of first data tones 526 from noise introduced by the set of PRTs 508. In one instance, the UE 115 may receive, from the BS 105, a request to assign different transmission power to the set of first data tones 526 and the set of second data tones 506 when the second order modulation scheme is equivalent to the first order modulation scheme. For example, both the set of first data tones 526 and the set of second data tones 506 may be modulated with a common modulation scheme, such as 256-QAM modulation. In this respect, the UE 115 may assign the first transmission power to the set of first data tones 526 and the second transmission power to the set of second data tones 506 based on the request.

The UE 115 may generate an outgoing waveform, such as waveform 516, based at least in part on the resource allocation 502. In some aspects, the UE 115 may generate the waveform 516 by determining an inverse discrete Fourier transform of the set of transmission tones 504. In some aspects, the waveform 516 may include a CP-OFDM waveform. In some aspects, the waveform 516 may include a DFT-s-OFDM waveform. In some aspects, the set of PRTs 508 may be selected such that a PAPR associated with the waveform 516 satisfies a PAPR threshold by the PAPR not exceeding the PAPR threshold. In some aspects, the UE 115 may generate the waveform 516 with the set of transmission tones 504 based on the PRT sequence 514, in which the PRT sequence 514 indicates an arrangement of the set of PRT locations 512 relative to the set of data tone locations 510 within the particular bandwidth.

In some aspects, the waveform 516 includes a first waveform that corresponds to the set of first data tones 526, a second waveform that corresponds to the set of second data tones 506 and a third waveform that corresponds to the set of PRTs 508. In an instance, the sum of the first waveform and the second waveform may produce a first PAPR value. In another instance, the sum of the first waveform, the second waveform and the third waveform may produce a second PAPR value that is lesser than the second PAPR value. In other aspects, the waveform 516 includes a first waveform that corresponds to the set of first data tones 526 and a second waveform that corresponds to the set of PRTs 508. In an instance, the waveform 516 may exclude a third waveform that corresponds to the set of second data tones 506 based on the set of second data tones 506 having correspondence to a different wireless communication device (e.g., a second UE 115) that is scheduled to transmit within the particular bandwidth assigned to the UE 115.

The UE 115 may transmit, and the BS 105 may receive, a data transmission 518 that includes an incoming waveform, such as the waveform 516, based at least in part on the resource allocation 502. In some aspects, the UE 115 may communicate the data transmission 518 with the BS 105 in a second subband of the plurality of subbands. In some aspects, the second subband includes a plurality of PUSCHs multiplexed in at least one of time or frequency. In this respect, the UE 115 may transmit, to the BS 105, the data transmission 518 in one or more PUSCHs of the plurality of PUSCHs. In some aspects, the UE 115 may transmit the data transmission 518 with the first transmission power corresponding to the set of first data tones 526 and the second transmission power corresponding to the set of second data tones 506.

Figure 6:
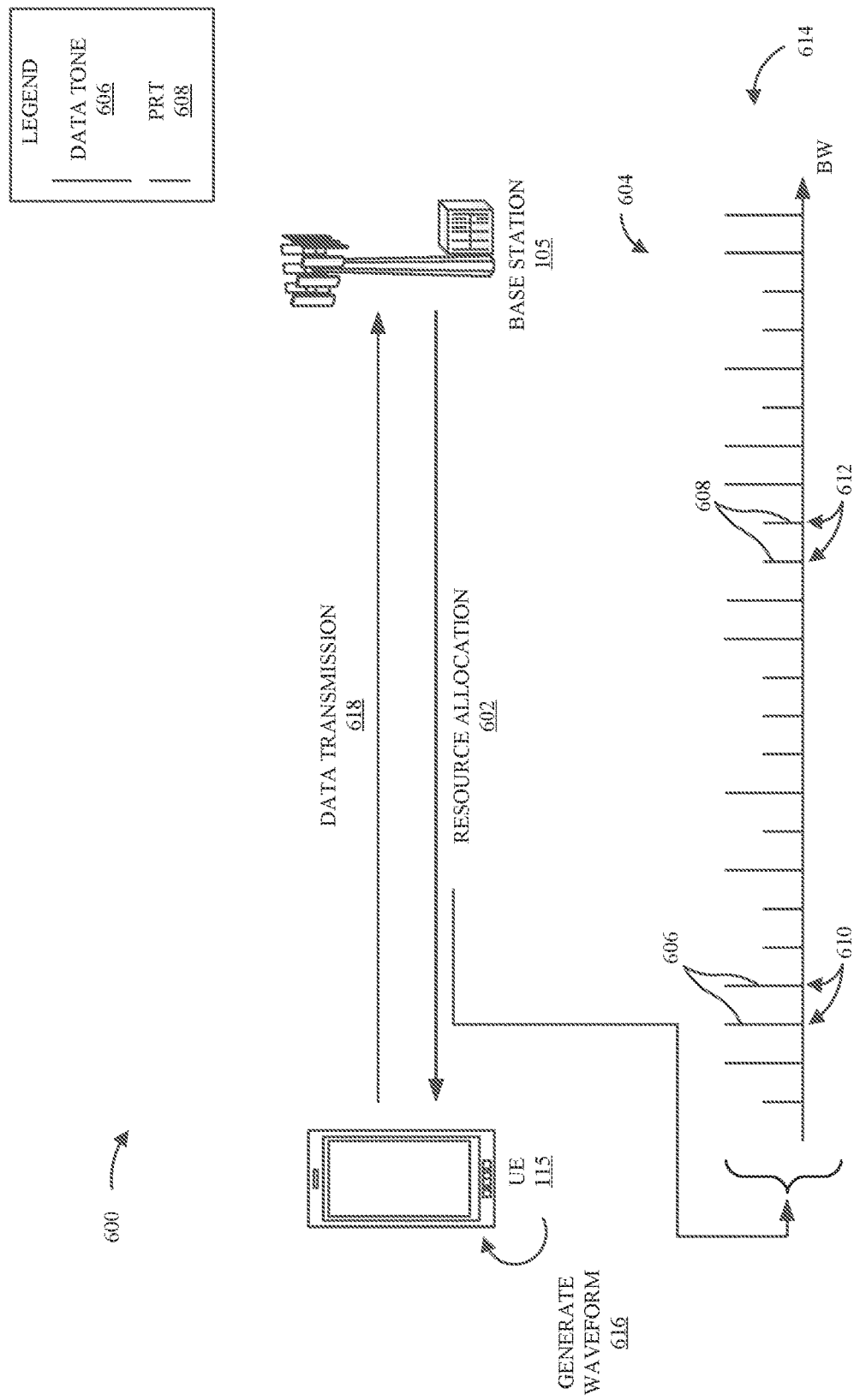
FIG. 6 illustrates a simplified diagram of an example of tone reservation with pseudo-random selected peak reduction tones, in accordance with various aspects of the present disclosure.

FIG. 6 illustrates a simplified diagram of an example of tone reservation with pseudo-random selected peak reduction tones, in accordance with various aspects of the present disclosure. As shown, a BS 105 and a UE 115 may communicate with one another.

The BS 105 may transmit, and the UE 115 may receive, a resource allocation 602. In some aspects, the resource allocation 602 may be carried in downlink control information (DCI), a radio resource control (RRC) message, a medium access control (MAC)-control element (CE), and/or the like. The resource allocation 602 may indicate a set of transmission tones 604. The set of transmission tones 604 may include a set of data tones 606 (depicted by the longer vertical bars) and a set of PRTs 608 (depicted by the shorter vertical bars). The resource allocation 602 may indicate a set of data tone locations 610 within a particular bandwidth (depicted as "BW"). The resource allocation 602 may indicate a set of PRT locations 612 within the particular bandwidth.

In some aspects, the set of PRT locations 612 may be arranged relative to the set of data tone locations 610 according to a PRT sequence 614. As shown, the PRT sequence 614 may include PRTs 608 interleaved with data tones 606. In some aspects, the PRT sequence 614 may include a pseudo-random pattern. In some aspects, the pseudo-random pattern may be generated using a pseudo-random number generator. The pseudo-random number generator may include a linear congruential generator, a Costas array, a maximum length sequence, a Gold sequence, and/or the like.

In some aspects, the resource allocation 602 may indicate the PRT sequence 614 by referencing a PRT table (PRTT). In some aspects, the PRTT may indicate a plurality of PRT sequences. In some aspects, the resource allocation 602 may indicate a set of resource blocks (RBs), and the UE 115 may determine, using the PRTT, the PRT sequence 614 based at least in part on a quantity of RBs in the set of RBs.

In some aspects, the PRTT may include a plurality of entries. An entry of the plurality of entries may include the PRT sequence 614, one or more parameters of the pseudo-random number generator, and/or the like. In some aspects, the plurality of entries may indicate a plurality of pseudo-random sequences. Each entry of the plurality of entries may correspond to a respective pseudo-random sequence of the plurality of pseudo-random sequences. In some aspects, each entry may indicate an offset associated with the respective pseudo-random sequence, a length associated with the respective pseudo-random sequence, and/or the like. In some aspects, each pseudo-random sequence of the plurality of pseudo-random sequences may correspond to a set of RBs allocated to the UE 115, a ratio of a quantity of PRTs 608 in the set of PRTs 608 to a quantity of data tones 606 in the set of data tones 606, and/or the like.

In some aspects, the resource allocation 602 may indicate the PRT sequence 614 by indicating the pseudo-random number generator for determining the PRT sequence 614. In some aspects, the pseudo-random number generator may include a seed. In some aspects, the resource allocation 602 may indicate the seed. In some aspects, the resource allocation may indicate one or more parameter values associated with one or more parameters of the pseudo-random number generator. In some aspects, a density of the PRTs 608 of the set of PRTs 608 may be based at least in part on the one or more parameters of the pseudo-random number generator, available bandwidth resources, and/or the like.

The UE 115 may generate a waveform 616 based at least in part on the resource allocation 602. In some aspects, the UE 115 may generate the waveform 616 by determining an inverse discrete Fourier transform of the set of transmission tones 604. In some aspects, the waveform 616 may include a CP-OFDM waveform. In some aspects, the waveform 616 may include a DFT-s-OFDM waveform. In some aspects, the set of PRTs 608 may be selected such that a PAPR associated with the waveform 616 satisfies a PAPR threshold.

The UE 115 may transmit, and the BS 105 may receive, a data transmission 618 using the waveform 616.

Figure 7:
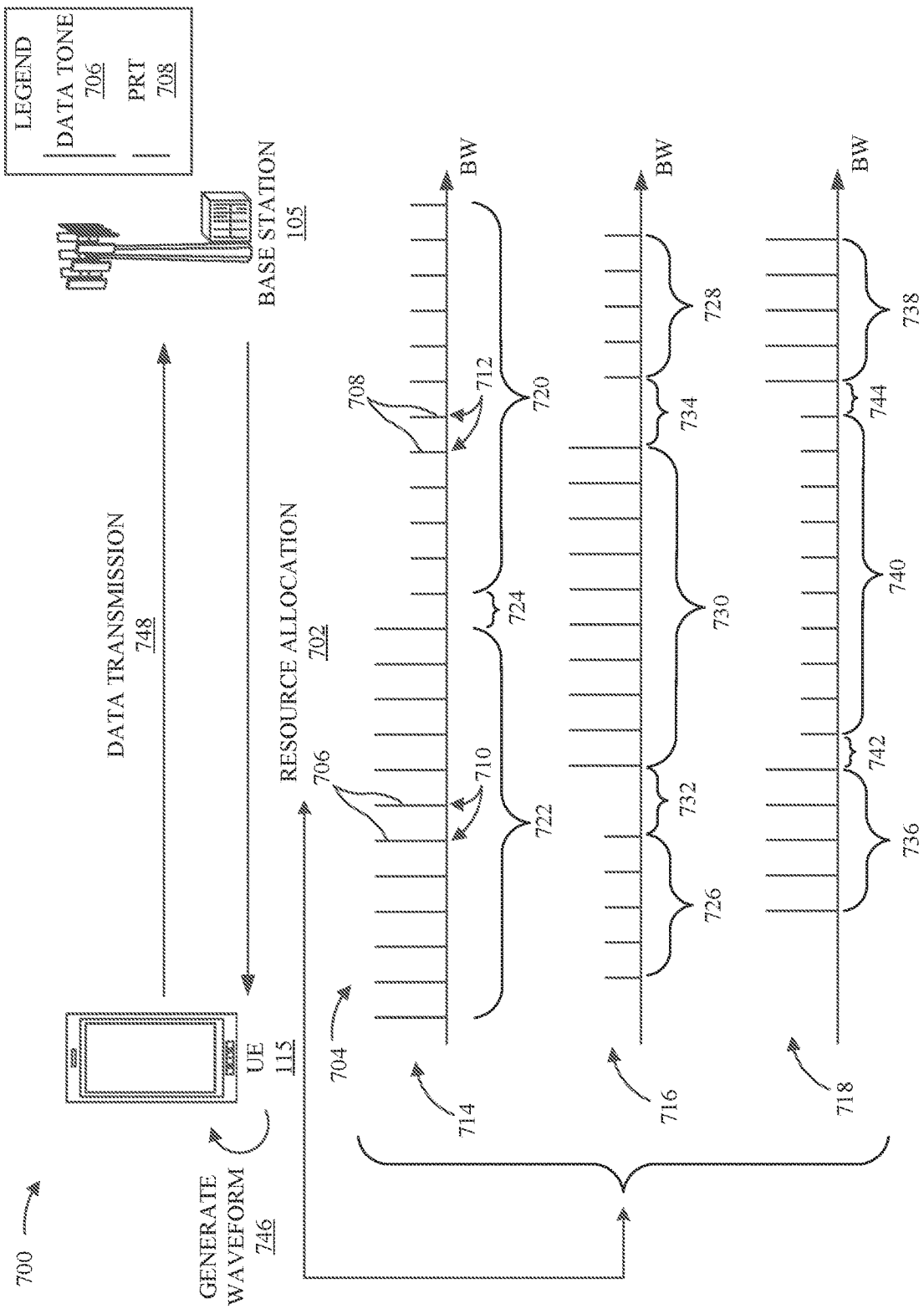
FIG. 7 illustrates a simplified diagram of an example of tone reservations with different peak reduction tone selections, in accordance with various aspects of the present disclosure.

FIG. 7 illustrates a simplified diagram of an example of tone reservations with different peak reduction tone selections, in accordance with various aspects of the present disclosure. As shown, a BS 105 and a UE 115 may communicate with one another.

The BS 105 may transmit, and the UE 115 may receive, a resource allocation 702. In some aspects, the resource allocation 702 may be carried in downlink control information (DCI), a radio resource control (RRC) message, a medium access control (MAC)-control element (CE), and/or the like. The resource allocation 702 may indicate a set of transmission tones 704. The set of transmission tones 704 may include a set of data tones 706 (depicted by the longer vertical bars) and a set of PRTs 708 (depicted by the shorter vertical bars). The resource allocation 702 may indicate a set of data tone locations 710 within a particular bandwidth (shown as "BW"). The resource allocation 702 may indicate a set of PRT locations 712 within the particular bandwidth.

In some aspects, the set of PRT locations 712 may be arranged relative to the set of data tone locations 710 according to a PRT sequence 714, 716, and/or 718. In some aspects, the PRT sequence 714, 716, and/or 718 may include a plurality of contiguous PRTs 720 of the set of PRTs 708 arranged relative to a plurality of contiguous data tones 722 of the set of data tones 706. As shown by the PRT sequence 714, the plurality of contiguous PRTs 720 may include the set of PRTs 708, and the plurality of contiguous data tones 722 may include the set of data tones 706. The plurality of contiguous PRTs 720 may be arranged on a first side of the set of data tones 706 or a second side of the set of data tones 706.

The plurality of contiguous PRTs 720 may have a PRT group length that indicates the quantity of PRTs 708 in the plurality of contiguous PRTs 720. Similarly, the plurality of contiguous data tones 722 may have a data tone group length that indicates the quantity of data tones 706 in the plurality of contiguous data tones 722. In some aspects, the resource allocation 702 may indicate a location of the plurality of contiguous PRTs 720 relative to a location of the plurality of contiguous data tones 722, the PRT group length, the data tone group length, and/or the like.

In some aspects, the PRT sequence 714, 716, and/or 718 may include a frequency gap 724 disposed between the plurality of contiguous PRTs 720 and the plurality of contiguous data tones 722. The frequency gap 724 may have a gap length corresponding to a frequency range. In some aspects, the resource allocation 702 may indicate a location of the frequency gap 724 relative to at least one of a location of the plurality of contiguous PRTs 720, a location of the plurality of contiguous data tones 722, or a combination thereof, the gap length, and/or the like. In some aspects, the resource allocation 702 may indicate a plurality of RBs, and an initial RB of the plurality of RBs may include a starting RB of the frequency gap 724.

In some aspects, as shown by the PRT sequence 716, the set of PRTs 708 may include a first plurality of contiguous PRTs 726 and a second plurality of contiguous PRTs 728. As shown, the PRT sequence 716 may include a plurality of contiguous data tones 730 that may include the set of data tones 706. The first plurality of contiguous PRTs 726 may be arranged on a first side of the plurality of contiguous data tones 730, and the second plurality of contiguous PRTs 728 may be arranged on a second side of the plurality of contiguous data tones 730.

The first plurality of contiguous PRTs 726 may have a first PRT group length, and the second plurality of contiguous PRTs 728 may have a second PRT group length. In some aspects, the first PRT group length may be equal to the second PRT group length. In some aspects, the first PRT group length may be different from the second PRT group length. In some aspects, the resource allocation 702 may indicate a location of the first plurality of contiguous PRTs 726 relative to a location of the plurality of contiguous data tones 730, a location of the second plurality of contiguous PRTs 728 relative to the location of the plurality of contiguous data tones 730, the first PRT group length, the second PRT group length, and/or the like.

The PRT sequence 716 may include a first frequency gap 732 between the first plurality of contiguous PRTs 726 and the plurality of contiguous data tones 730. In some aspects, the PRT sequence 716 may include a second frequency gap 734 between the plurality of contiguous data tones 730 and the second plurality of contiguous PRTs 728. The first frequency gap 732 may have a first gap length corresponding to a first frequency range, and the second frequency gap 734 may have a second gap length corresponding to a second frequency range. In some aspects, the first gap length may be equal to the second gap length. In some aspects, the first gap length may be different from the second gap length.

In some aspects, the resource allocation 702 may indicate at least one of a location of the first frequency gap 732 relative to a location of the first plurality of contiguous PRTs 726, a location of the plurality of contiguous data tones 730, or a combination thereof, a location of the second frequency gap 734 relative to a location of the second plurality of contiguous PRTs 728, the location of the plurality of contiguous data tones 730, or a combination thereof, the first gap length, the second gap length, and/or the like. In some aspects, the resource allocation 702 indicates a plurality of RBs, and an initial RB of the plurality of RBs may include a starting RB of the first frequency gap 732 and/or a starting RB of the second frequency gap 734.

As shown by PRT sequence 718, the set of data tones 706 may include a first plurality of contiguous data tones 736 and a second plurality of contiguous data tones 738. In some aspects, the PRT sequence 718 may include a plurality of contiguous PRTs 740 that includes the set of PRTs 708. In some aspects, the first plurality of contiguous data tones 736 may be arranged on a first side of the plurality of contiguous PRTs 740, and the second plurality of contiguous data tones 738 may be arranged on a second side of the plurality of contiguous PRTs 740.

The first plurality of contiguous data tones 736 may have a first data tone group length, and the second plurality of contiguous data tones 738 may have a second data tone group length. In some aspects, the first data tone group length may be equal to the second data tone group length. In some aspects, the first data tone group length may be different from the second data tone group length. In some aspects, the resource allocation 702 may indicate a location of the first plurality of contiguous data tones 736 relative to a location of the plurality of contiguous PRTs 740, a location of the second plurality of contiguous data tones 738 relative to the location of the plurality of contiguous PRTs 740, the first data tone group length, the second data tone group length, and/or the like.

In some aspects, the PRT sequence 718 may include a first frequency gap 742 between the first plurality of contiguous data tones 736 and the plurality of contiguous PRTs 740. The PRT sequence 718 may include a second frequency gap 744 between the plurality of contiguous PRTs 740 and the second plurality of contiguous data tones 738. In some aspects, the first frequency gap 742 may have a first gap length corresponding to a first frequency range, and the second frequency gap 744 may have a second gap length corresponding to a second frequency range. In some aspects, the first gap length may be equal to the second gap length. In some aspects, the first gap length may be different from the second gap length.

In some aspects, the resource allocation 702 may indicate a location of the first frequency gap 742 relative to a location of the first plurality of contiguous data tones 736, a location of the plurality of contiguous PRTs 740, or a combination thereof, a location of the second frequency gap 744 relative to a location of the second plurality of contiguous data tones 738, the location of the plurality of contiguous PRTs 740, or a combination thereof, the first gap length, the second gap length, and/or the like. In some aspects, the resource allocation 702 may indicate a plurality of RBs, and an initial RB of the plurality of RBs may include a starting RB of the first frequency gap 742 and/or a starting RB of the second frequency gap 744.

In some aspects, the resource allocation 702 may indicate the PRT sequence (e.g., 714, 716, 718) by referencing the PRTT. In some aspects, the resource allocation 702 may indicate a set of RBs. In some aspects, the UE 115 may determine, using the PRTT, the PRT sequence based at least in part on a quantity of RBs in the set of RBs. In some aspects, the PRTT may include a plurality of entries. An entry of the plurality of entries may include the PRT sequence, one or more parameters of a deterministic function for determining the PRT sequence, a starting index associated with the PRT sequence, an ending index associated with the PRT sequence, and/or the like.

In some aspects, the resource allocation 702 may indicate the PRT sequence by indicating a deterministic function for determining the PRT sequence. In some aspects, the deterministic function may include one or more flexible parameters. The BS 105 may transmit, and the UE 115 may receive, an indication of one or more parameter values corresponding to the one or more flexible parameters.

In some aspects, the resource allocation 702 may indicate a set of PRT resources corresponding to the set of PRTs, a set of data tone resources corresponding to the set of data tones, and/or the like. In some aspects, the resource allocation 702 may indicate a plurality of RBs, a location of the set of PRT resources relative to an initial RB of the plurality of RBs, a location of the set of data tone resources relative to the initial RB, and/or the like. In some aspects, the resource allocation 702 may include a bit mask that indicates a location of each of one or more PRTs of the set of PRTs relative to a location of each of one or more data tones of the set of data tones 706.

The UE 115 may generate a waveform 746 based at least in part on the resource allocation 702. In some aspects, the UE 115 may generate the waveform 746 by determining an inverse discrete Fourier transform of the set of transmission tones 704. In some aspects, the waveform 746 may include a CP-OFDM waveform. In some aspects, the waveform 746 may include a DFT-s-OFDM waveform. In some aspects, the set of PRTs 708 may be selected such that a PAPR associated with the waveform 746 satisfies a PAPR threshold.

The UE 115 may transmit, and the BS 105 may receive, a data transmission 748 using the waveform 746.

FIG. 8 illustrates a flow diagram of an exemplary process 800 of allocating peak reduction tones with overlapping data tones according to aspects of the present disclosure. Aspects of the process 800 can be executed by a computing device (e.g., a processor, processing circuit, and/or other suitable component) of a wireless communication device or other suitable means for performing the steps. For example, a wireless communication device, such as the UEs 115, UE 215 and/or 300, may utilize one or more components, such as the processor 302, the memory 304, the resource allocation module 308, the transceiver 310, the modem 312, and the one or more antennas 316, to execute the steps of process 800. As illustrated, the process 800 includes a number of enumerated steps, but aspects of the process 800 may include additional steps before, after, and in between the enumerated steps. In some aspects, one or more of the enumerated steps may be omitted or performed in a different order.

The process 800 starts at block 802, where the UE receives, from a base station (e.g., BS 105) in a first subband of a plurality of subbands, a resource allocation (e.g., 502) indicating a set of transmission tones comprising a set of first data tones (e.g., 526), a set of second data tones (e.g., 506) and a set of peak reduction tones (e.g., 508). For example, the resource allocation may indicate the set of first data tones overlaps at least a portion of the set of PRTs at respective locations of a set of PRT locations and the set of second data tones is arranged at a set of data tone locations that are non-overlapping with the set of PRT locations within a particular bandwidth. For instance, the UE may utilize one or more components, such as the processor 302, the transceiver 310, the modem 312, the RF unit 314, and the one or more antennas 316, to receive the resource allocation.

Next, at step 804, the UE communicates, with the base station in a second subband of the plurality of subbands, a data transmission (e.g., 518) using an outgoing waveform (e.g., 516) based at least in part on the resource allocation. For instance, the UE may utilize one or more components, such as the processor 302, the transceiver 310, the modem 312, the RF unit 314, and the one or more antennas 316, to communicate the data transmission.

Figure 9:
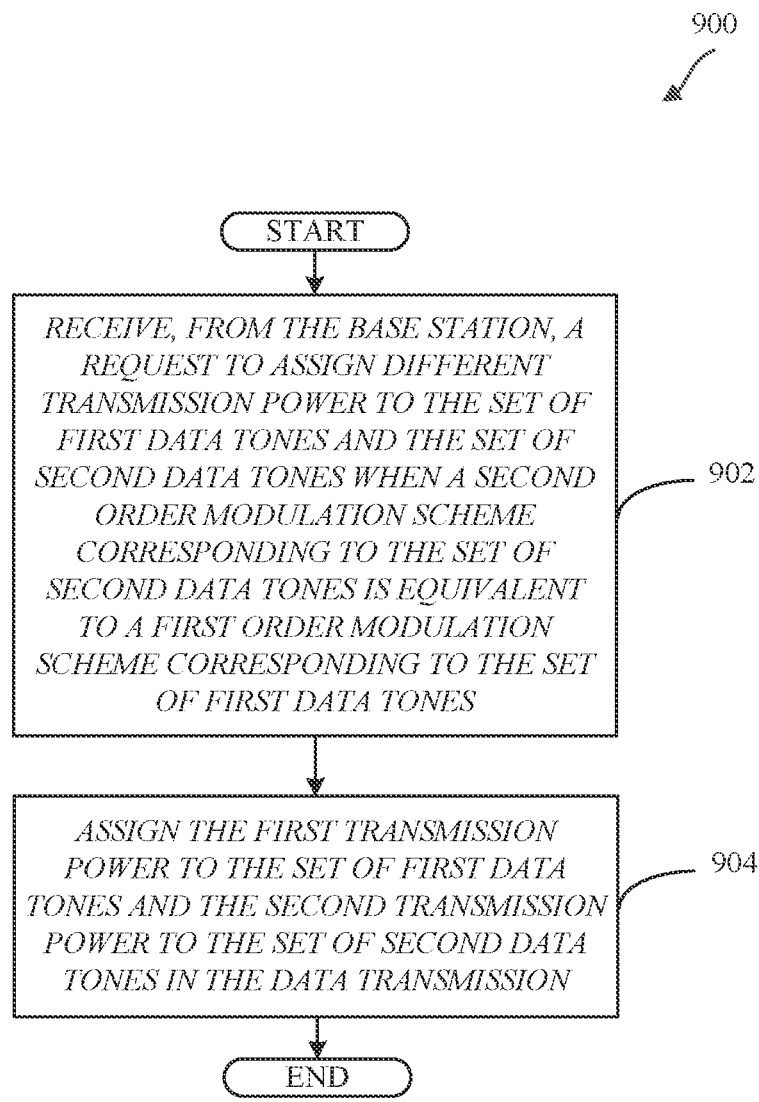
FIG. 9 illustrates a flow diagram of an exemplary process of assigning different transmission power to different subsets of data tones based on a request according to aspects of the present disclosure.

FIG. 9 illustrates a flow diagram of an exemplary process 900 of assigning different transmission power to different subsets of data tones based on a request according to aspects of the present disclosure. Aspects of the process 900 can be executed by a computing device (e.g., a processor, processing circuit, and/or other suitable component) of a wireless communication device or other suitable means for performing the steps. For example, a wireless communication device, such as the UEs 115, UE 215 and/or 300, may utilize one or more components, such as the processor 302, the memory 304, the resource allocation module 308, the transceiver 310, the modem 312, and the one or more antennas 316, to execute the steps of process 900. As illustrated, the process 900 includes a number of enumerated steps, but aspects of the process 900 may include additional steps before, after, and in between the enumerated steps. In some aspects, one or more of the enumerated steps may be omitted or performed in a different order.

The process 900 starts at block 902, where the UE receives, from the base station, a request to assign different transmission power to the set of first data tones (e.g., 526) and the set of second data tones (e.g., 506) when a second order modulation scheme corresponding to the set of second data tones is equivalent to a first order modulation scheme corresponding to the set of first data tones. In some aspects, the first transmission power is greater than the second transmission power in the data transmission to help prevent significant distortion to the set of first data tones from noise introduced by the set of PRTs (e.g., 508). For instance, the UE may utilize one or more components, such as the processor 302, the transceiver 310, the modem 312, the RF unit 314, and the one or more antennas 316, to receive the request.

Next, at step 904, the UE assigns the first transmission power to the set of first data tones and the second transmission power to the set of second data tones in the data transmission. For instance, the UE may utilize one or more components, such as the processor 302, the resource allocation module 308 and the transceiver 310, to assign the first transmission power and the second transmission power.

Figure 10:
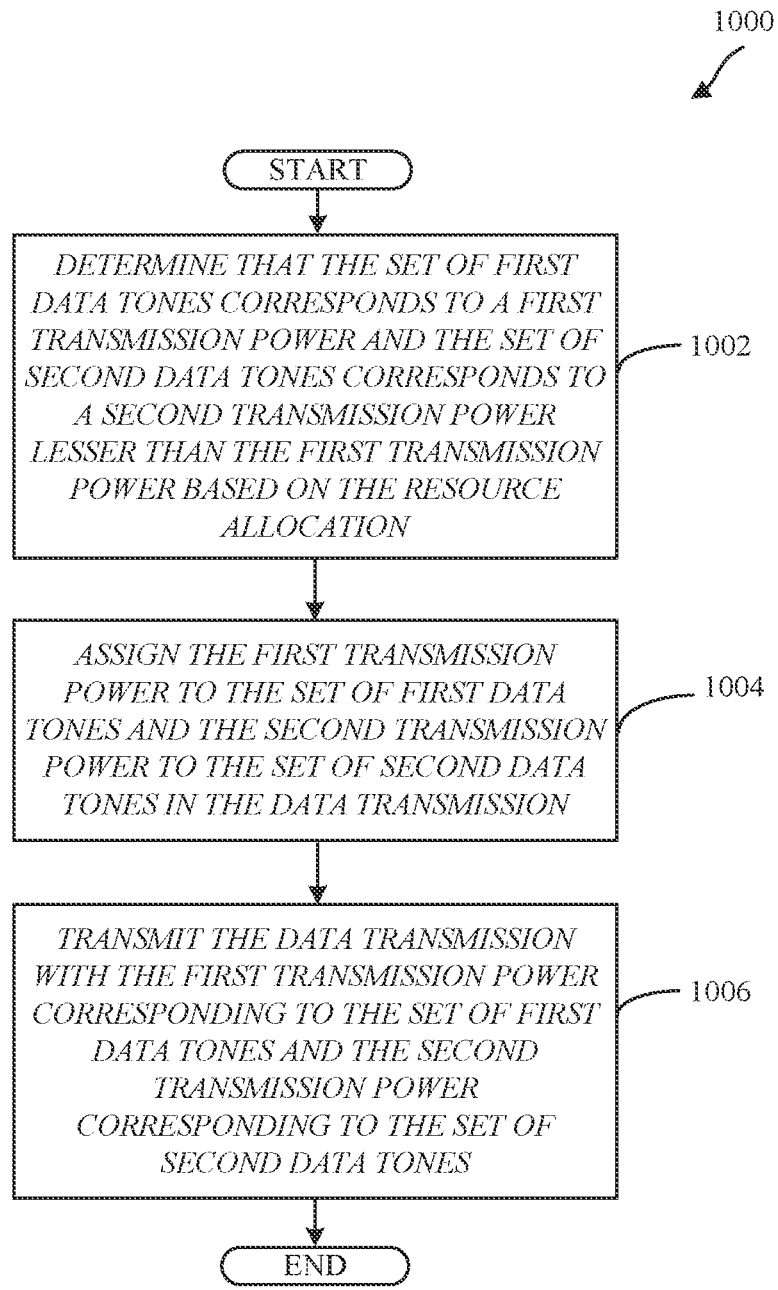
FIG. 10 illustrates a flow diagram of an exemplary process of assigning different transmission power to different subsets of data tones based on a received resource allocation according to aspects of the present disclosure.

FIG. 10 illustrates a flow diagram of an exemplary process 1000 of assigning different transmission power to different subsets of data tones based on a received resource allocation according to aspects of the present disclosure. Aspects of the process 1000 can be executed by a computing device (e.g., a processor, processing circuit, and/or other suitable component) of a wireless communication device or other suitable means for performing the steps. For example, a wireless communication device, such as the UEs 115, UE 215 and/or 300, may utilize one or more components, such as the processor 302, the memory 304, the resource allocation module 308, the transceiver 310, the modem 312, and the one or more antennas 316, to execute the steps of process 1000. As illustrated, the process 1000 includes a number of enumerated steps, but aspects of the process 1000 may include additional steps before, after, and in between the enumerated steps. In some aspects, one or more of the enumerated steps may be omitted or performed in a different order.

The process 1000 starts at block 1002, where the UE determines that the set of first data tones (e.g., 526) corresponds to a first transmission power and the set of second data tones (e.g., 506) corresponds to a second transmission power based on the resource allocation (e.g., 502). In some aspects, the first transmission power is greater than the second transmission power in the data transmission to help prevent significant distortion to the set of first data tones from noise introduced by the set of PRTs (e.g., 508). For instance, the UE may utilize one or more components, such as the processor 302, the resource allocation module 308 and the transceiver 310, to determine the first transmission power and the second transmission power.

Next, at step 1004, the UE assigns the first transmission power to the set of first data tones and the second transmission power to the set of second data tones in the data transmission. For instance, the UE may utilize one or more components, such as the processor 302, the resource allocation module 308 and the transceiver 310, to assign the first transmission power and the second transmission power.

Subsequently, at step 1006, the UE transmits the data transmission with the first transmission power corresponding to the set of first data tones and the second transmission power corresponding to the set of second data tones. For instance, the UE may utilize one or more components, such as the processor 302, the transceiver 310, the modem 312, the RF unit 314, and the one or more antennas 316, to transmit the data transmission.

Figure 11:
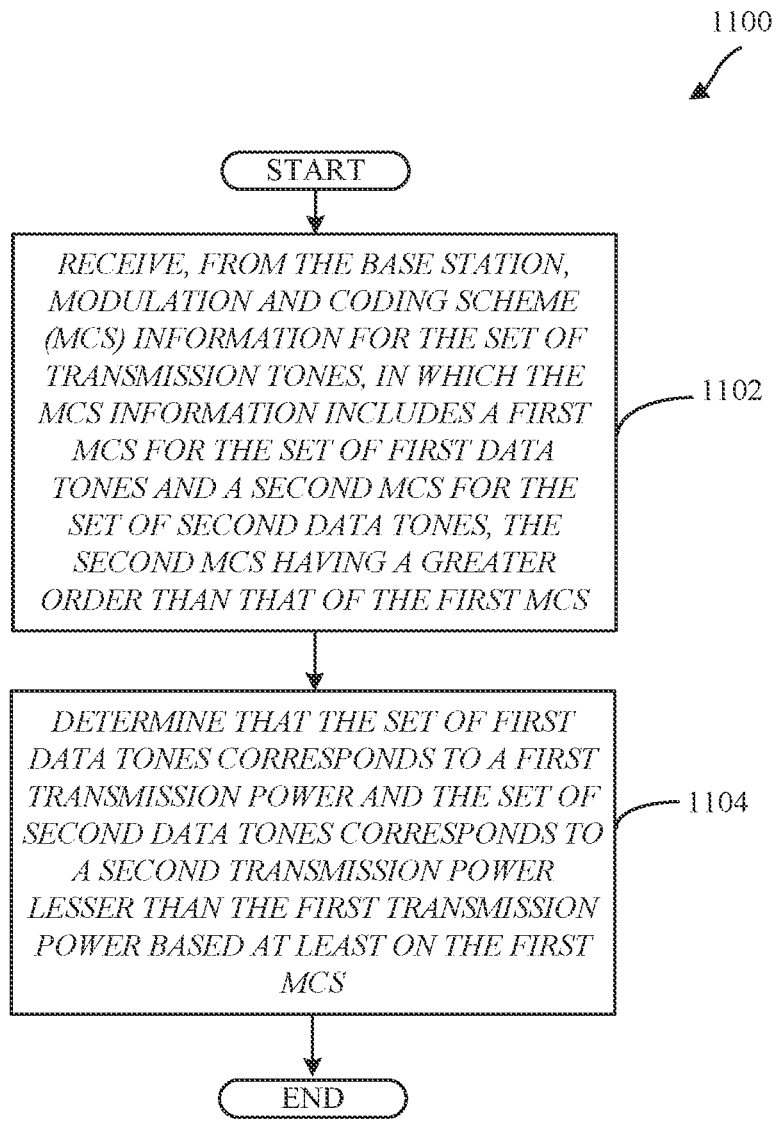
FIG. 11 illustrates a flow diagram of an exemplary process of assigning different transmission power to different subsets of data tones based on a modulation scheme according to aspects of the present disclosure.

FIG. 11 illustrates a flow diagram of an exemplary process 1100 of assigning different transmission power to different subsets of data tones based on a modulation scheme according to aspects of the present disclosure. Aspects of the process 1100 can be executed by a computing device (e.g., a processor, processing circuit, and/or other suitable component) of a wireless communication device or other suitable means for performing the steps. For example, a wireless communication device, such as the UEs 115, UE 215 and/or 300, may utilize one or more components, such as the processor 302, the memory 304, the resource allocation module 308, the transceiver 310, the modem 312, and the one or more antennas 316, to execute the steps of process 1100. As illustrated, the process 1100 includes a number of enumerated steps, but aspects of the process 1100 may include additional steps before, after, and in between the enumerated steps. In some aspects, one or more of the enumerated steps may be omitted or performed in a different order.

The process 1100 starts at block 1102, where the UE receives, from a base station (e.g., BS 105), modulation and coding scheme (MCS) information for the set of transmission tones. In some aspects, the MCS information includes a first MCS for the set of first data tones (e.g., 526) and a second MCS for the set of second data tones (e.g., 506). In some aspects, the second MCS has a greater order than that of the first MCS. For instance, the UE may utilize one or more components, such as the processor 302, the transceiver 310, the modem 312, the RF unit 314, and the one or more antennas 316, to receive the MCS information.

Next, at block 1104, where the UE determines that the set of first data tones corresponds to a first transmission power and the set of second data tones corresponds to a second transmission power lesser than the first transmission power based at least on the first MCS. In some aspects, the first transmission power is greater than the second transmission power in the data transmission to help prevent significant distortion to the set of first data tones from noise introduced by the set of PRTs (e.g., 508). For instance, the UE may utilize one or more components, such as the processor 302, the resource allocation module 308 and the transceiver 310, to determine the first transmission power and the second transmission power.

Figure 12:
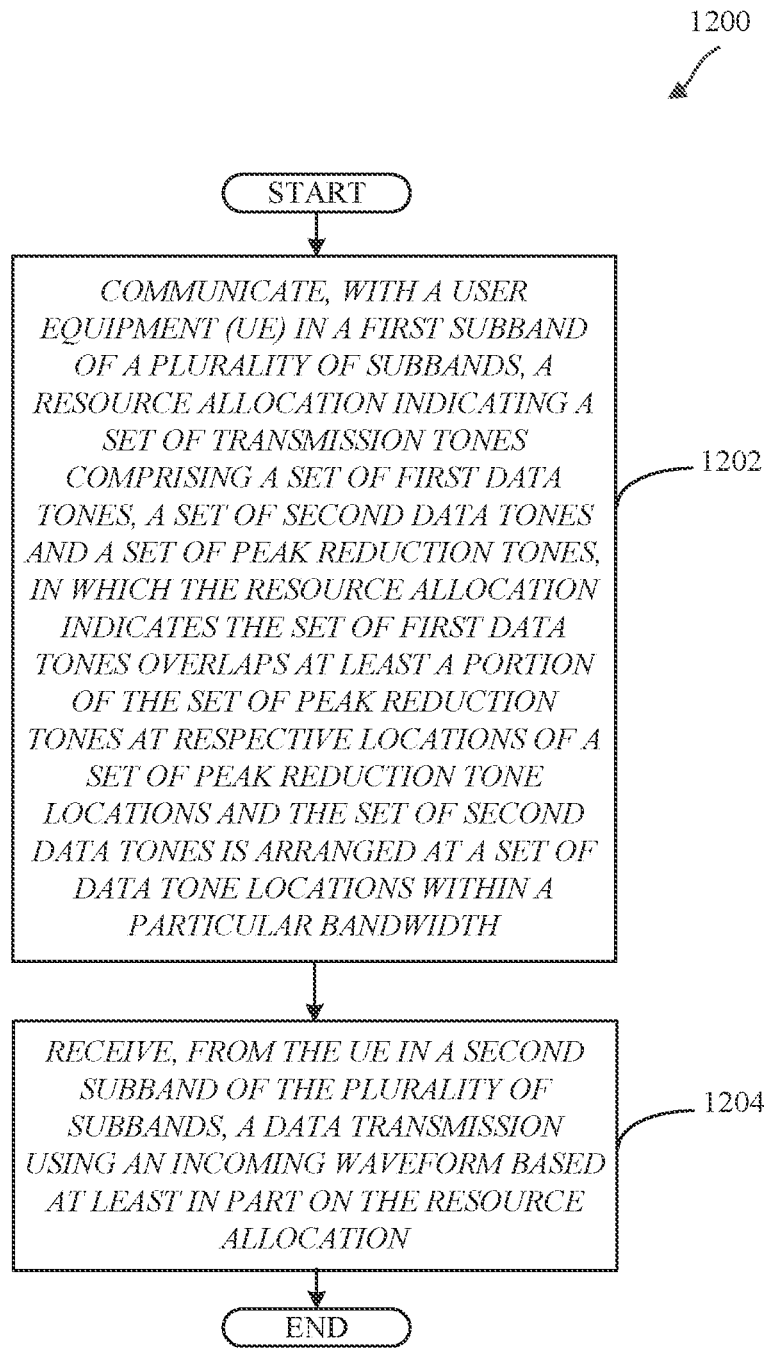
FIG. 12 illustrates a flow diagram of an exemplary process of configuring peak reduction tones with overlapping data tones according to aspects of the present disclosure.

FIG. 12 illustrates a flow diagram of an exemplary process 1200 of configuring peak reduction tones with overlapping data tones according to aspects of the present disclosure. Aspects of the process 1200 can be executed by a computing device (e.g., a processor, processing circuit, and/or other suitable component) of a wireless communication device or other suitable means for performing the steps. For example, a wireless communication device, such as the BSs 105, 205 and/or 400, may utilize one or more components, such as the processor 402, the memory 404, the resource configuration module 408, the transceiver 410, the modem 412, and the one or more antennas 416, to execute the steps of process 1200. As illustrated, the process 1200 includes a number of enumerated steps, but aspects of the process 1200 may include additional steps before, after, and in between the enumerated steps. In some aspects, one or more of the enumerated steps may be omitted or performed in a different order.

The process 1200 starts at block 1202, where the BS communicates, with a user equipment (e.g., 115) in a first subband of a plurality of subbands, a resource allocation 502 indicating a set of transmission tones (e.g., 504) comprising a set of first data tones (e.g., 526), a set of second data tones (e.g., 506) and a set of peak reduction tones (e.g., 508). In some aspects, the resource allocation 502 indicates the set of first data tones overlaps at least a portion of the set of PRTs at respective locations of a set of PRT locations and the set of second data tones is arranged at a set of data tone locations within a particular bandwidth. For instance, the BS may utilize one or more components, such as the processor 402, the transceiver 410, the modem 412, the RF unit 414, and the one or more antennas 416, to communicate the resource allocation.

Next, at step 1204, the BS receives, from the UE in a second subband of the plurality of subbands, a data transmission (e.g., 518) comprising an incoming waveform (e.g., 516) based at least in part on the resource allocation. For instance, the BS may utilize one or more components, such as the processor 402, the transceiver 410, the modem 412, the RF unit 414, and the one or more antennas 416, to receive the data transmission.

Recitations of Some Aspects of the Disclosure

Aspect 1: A method of wireless communication performed by a wireless communication device, comprising: receiving, from a base station in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and communicating, with the base station in a second subband of the plurality of subbands, a data transmission using an outgoing waveform based at least in part on the resource allocation.

Aspect 2: The method of aspect 1, wherein the set of first data tones is arranged non-overlapping with the set of second data tones.

Aspect 3: The method of aspect 1, wherein the set of first data tones overlaps at least in part the set of PRTs.

Aspect 4: The method of aspect 1 or 3, wherein the set of first data tones substantially overlaps the set of PRTs.

Aspect 5: The method of any of aspects 1-4, wherein set of second data tones is arranged non-overlapping with the set of PRTs.

Aspect 6: The method of any of aspects 1-4, wherein the set of second data tones partially overlaps the set of PRTs by a first overlap amount, wherein the set of first data tones overlaps at least in part the set of PRTs by at least a second overlap amount, wherein the second overlap amount is greater than the first overlap amount.

Aspect 7: The method of any of aspects 1-6, wherein the set of first data tones comprises first data tones that correspond to a first order modulation scheme and the set of second data tones comprises second data tones that correspond to a second order modulation scheme.

Aspect 8: The method of aspect 7, wherein the second order modulation scheme is different from the first order modulation scheme.

Aspect 9: The method of aspect 7 or 8, wherein the second order modulation scheme has a higher order than the first order modulation scheme.

Aspect 10: The method of aspect 7, wherein the second order modulation scheme is equivalent to the first order modulation scheme.

Aspect 11: The method of any of aspects 1-10, further comprising: assigning a first transmission power to the set of first data tones and a second transmission power to the set of second data tones, wherein the first transmission power is greater than the second transmission power in the data transmission.

Aspect 12: The method of aspect 11, further comprising: receiving, from the base station, a request to assign different transmission power to the set of first data tones and the set of second data tones when the second order modulation scheme is equivalent to the first order modulation scheme, wherein the assigning the first transmission power comprises assigning the first transmission power to the set of first data tones and the second transmission power to the set of second data tones based on the request.

Aspect 13: The method of any of aspects 1-12, further comprising: generating the outgoing waveform based at least in part on the resource allocation, the outgoing waveform comprising a first waveform corresponding to the set of first data tones, a second waveform corresponding to the set of second data tones and a third waveform corresponding to the set of PRTs, wherein a sum of the first waveform and the second waveform produces a first peak-to-average power ratio (PAPR) value, wherein a sum of the first waveform, the second waveform and the third waveform produces a second PAPR value, wherein the first PAPR value is greater than the second PAPR value.

Aspect 14: The method of any of aspects 1-13, further comprising: generating the outgoing waveform based at least in part on the resource allocation, the outgoing waveform comprising a first waveform corresponding to the set of first data tones and a second waveform corresponding to the set of PRTs, wherein the outgoing waveform excludes a third waveform corresponding to the set of second data tones based on the set of second data tones having correspondence to a different wireless communication device that is scheduled to transmit within the particular bandwidth assigned to the wireless communication device.

Aspect 15: The method of any of aspects 1-13, wherein: the first subband includes a plurality of physical downlink control channels (PDCCHs) multiplexed in at least one of time or frequency, and the receiving the resource allocation comprises: receiving, from the base station, one or more PDCCHs of the plurality of PDCCHs, and decoding the one or more PDCCHs to recover downlink control information (DCI) in the one or more PDCCHs of the plurality of PDCCHs, the DCI comprising a frequency domain resource assignment for the wireless communication device that includes the resource allocation.

Aspect 16: The method of aspect 15, further comprising: decoding the DCI to recover a PRT table (PRTT) associated with the resource allocation.

Aspect 17: The method of aspect 15 or 16, further comprising: obtaining an indication of one or more entries in the PRTT that includes a PRT sequence, from the DCI; and acquiring the PRT sequence from the one or more entries in the PRTT.

Aspect 18: The method of any of aspects 15-17, wherein the PRTT provides predetermined PRT locations for the set of PRT locations with the PRT sequence.

Aspect 19: The method of any of aspects 15-17, wherein the set of PRT locations is arranged relative to the set of data tone locations according to the PRT sequence.

Aspect 20: The method of any of aspects 15-19, further comprising: obtaining an indication of one or more entries in the PRTT that includes one or more parameters to a deterministic function, from the DCI; and generating a PRT sequence associated with the resource allocation using the deterministic function with the one or more parameters.

Aspect 21: The method of aspect 20, wherein the deterministic function comprises at least one of a Golomb ruler, a Costas array, a Gold sequence, or a linear function.

Aspect 22: The method of aspect 20 or 21, wherein the deterministic function provides predetermined PRT locations for the set of PRT locations with the PRT sequence.

Aspect 23: The method of any of aspects 16-22, further comprising: determining that the set of first data tones corresponds to a first transmission power and the set of second data tones corresponds to a second transmission power based on one or more entries in the PRTT, wherein the first transmission power is greater than the second transmission power.

Aspect 24: The method of any of aspects 1-23, wherein the receiving the resource allocation comprises receiving, from the base station, a PRT sequence that indicates which tones in the set of transmission tones are designated as the set of PRTs.

Aspect 25: The method of any of aspects 1-24, further comprising: generating the outgoing waveform with the set of transmission tones based on a PRT sequence, the PRT sequence indicating an arrangement of the set of PRT locations relative to the set of data tone locations within the particular bandwidth.

Aspect 26: The method of aspect 25, further comprising: determining that the set of first data tones corresponds to a first order modulation scheme based on the PRT sequence, wherein the PRT sequence indicates the set of second data tones corresponds to a second order modulation scheme that has an order greater than that of the first order modulation scheme.

Aspect 27: The method of any of aspects 1-24, wherein the receiving the resource allocation comprises receiving, from the base station, modulation and coding scheme (MCS) information for the set of transmission tones.

Aspect 28: The method of aspect 27, wherein the MCS information comprises a first MCS for the set of first data tones and a second MCS for the set of second data tones, and wherein the second MCS has an order greater than that of the first MCS.

Aspect 29: The method of aspect 27 or 28, wherein the MCS information comprises a second MCS for the set of second data tones, further comprising: determining a first MCS for the set of first data tones based on at least a portion of the second MCS.

Aspect 30: The method of any of aspects 27-39, wherein the MCS information comprises a first MCS for the set of first data tones and a second MCS for the set of second data tones, wherein the second MCS has a greater order than that of the first MCS, further comprising: determining that the set of first data tones corresponds to a first transmission power and the set of second data tones corresponds to a second transmission power based on at least the first MCS, wherein the first transmission power is greater than the second transmission power.

Aspect 31: The method of any of aspects 1-30, wherein: the second subband includes a plurality of physical uplink shared channels (PUSCHs) multiplexed in at least one of time or frequency, and the communicating the data transmission comprises transmitting, to the base station, the data transmission in one or more PUSCHs of the plurality of PUSCHs.

Aspect 32: The method of any of aspects 1-31, wherein the receiving the resource allocation comprises receiving, from the base station, the resource allocation in a radio resource control (RRC) message.

Aspect 33: The method of any of aspects 1-32, wherein the receiving the resource allocation comprises receiving, from the base station, the resource allocation in a medium access control (MAC) control element (MAC-CE).

Aspect 34: The method of any of aspects 1-33, further comprising: determining that the set of first data tones corresponds to a first transmission power and the set of second data tones corresponds to a second transmission power based on the resource allocation, wherein the first transmission power is greater than the second transmission power; and assigning the first transmission power to the set of first data tones and the second transmission power to the set of second data tones in the data transmission, wherein the communicating the data transmission comprises transmitting the data transmission with the first transmission power corresponding to the set of first data tones and the second transmission power corresponding to the set of second data tones.

Aspect 35: A user equipment (UE), comprising: a memory; a processor coupled to the memory and configured to, when executing instructions stored on the memory, to cause the UE to perform the methods of aspects 1-34.

Aspect 36: A non-transitory computer-readable medium (CRM) having program code recorded thereon, the program code comprises code for causing a UE to perform the methods of aspects 1-34.

Aspect 37: A user equipment (UE) comprising means for performing the methods of aspects 1-34.

Aspect 38: A method of wireless communication performed by a base station, comprising: transmitting, to a user equipment in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and receiving, with the user equipment in a second subband of the plurality of subbands, a data transmission using an outgoing waveform based at least in part on the resource allocation.

Aspect 39: The method of aspect 38, further comprising transmitting a modulation and coding scheme (MCS) information for the set of transmission tones, wherein: the MCS information includes a first MCS for the set of first data tones and a second MCS for the set of second data tones; and the second MCS has an order greater than that of the first MCS.

Aspect 40: The method of aspect 38 or 39, wherein a first transmission power corresponding to the set of first data tones is greater than a second transmission power corresponding to the set of second data tones.

Aspect 41: A base station, comprising: a memory; a processor coupled to the memory and configured to, when executing instructions stored on the memory, to cause the BS to perform the methods of aspects 38-40.

Aspect 41: A non-transitory computer-readable medium (CRM) having program code recorded thereon, the program code comprises code for causing a BS to perform the methods of aspects 38-40.

Aspect 42: A base station (BS) comprising means for performing the methods of aspects 38-40.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor also may be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions also may be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment, comprising:
receiving, from a base station in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and
communicating, with the base station in a second subband of the plurality of subbands, a data transmission using an outgoing waveform based at least in part on the resource allocation.

2. The method of claim 1, wherein the set of first data tones is arranged non-overlapping with the set of second data tones.

3. The method of claim 1, wherein the set of first data tones overlaps at least in part the set of PRTs.

4. The method of claim 1, wherein set of second data tones is arranged non-overlapping with the set of PRTs.

5. The method of claim 1, wherein the set of second data tones partially overlaps the set of PRTs by a first overlap amount, wherein the set of first data tones overlaps at least in part the set of PRTs by at least a second overlap amount, wherein the second overlap amount is greater than the first overlap amount.

6. The method of claim 1, wherein the set of first data tones comprises first data tones that correspond to a first order modulation scheme and the set of second data tones comprises second data tones that correspond to a second order modulation scheme that is different from the first order modulation scheme.

7. The method of claim 6, wherein the second order modulation scheme has a higher order than the first order modulation scheme.

8. The method of claim 1, further comprising:
generating the outgoing waveform based at least in part on the resource allocation, the outgoing waveform comprising a first waveform corresponding to the set of first data tones, a second waveform corresponding to the set of second data tones and a third waveform corresponding to the set of PRTs, wherein a sum of the first waveform and the second waveform produces a first peak-to-average power ratio (PAPR) value, wherein a sum of the first waveform, the second waveform and the third waveform produces a second PAPR value, wherein the first PAPR value is greater than the second PAPR value.

9. The method of claim 1, further comprising:
generating the outgoing waveform based at least in part on the resource allocation, the outgoing waveform comprising a first waveform corresponding to the set of first data tones and a second waveform corresponding to the set of PRTs, wherein the outgoing waveform excludes a third waveform corresponding to the set of second data tones based on the set of second data tones having correspondence to a different user equipment that is scheduled to transmit within the particular bandwidth assigned to the user equipment.

10. A user equipment (UE) for wireless communications, comprising:
a transceiver configured to:
receive, from a base station in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and
communicate, with the base station in a second subband of the plurality of subbands, a data transmission using an outgoing waveform based at least in part on the resource allocation.

11. The user equipment of claim 10, wherein:
the first subband includes a plurality of physical downlink control channels (PDCCHs) multiplexed in at least one of time or frequency, and
the transceiver configured to receive the resource allocation is further configured to:
receive, from the base station, one or more PDCCHs of the plurality of PDCCHs, and
decode the one or more PDCCHs to recover downlink control information (DCI) in the one or more PDCCHs of the plurality of PDCCHs,
the DCI comprising a frequency domain resource assignment for the UE that includes the resource allocation.

12. The user equipment of claim 11, wherein the transceiver is further configured to decode the DCI to recover a PRT table (PRTT) associated with the resource allocation.

13. The user equipment of claim 12, further comprising a processor configured to:
obtain an indication of one or more entries in the PRTT that includes a PRT sequence, from the DCI; and
acquire the PRT sequence from the one or more entries in the PRTT.

14. The user equipment of claim 13, wherein:
the PRTT provides predetermined PRT locations for the set of PRT locations with the PRT sequence; and
the set of PRT locations is arranged relative to the set of data tone locations according to the PRT sequence.

15. The user equipment of claim 12, further comprising a processor configured to:
obtain an indication of one or more entries in the PRTT that includes one or more parameters to a deterministic function, from the DCI; and
generate a PRT sequence associated with the resource allocation using the deterministic function with the one or more parameters.

16. The user equipment of claim 15, wherein:
the deterministic function comprises at least one of a Golomb ruler, a Costas array, a Gold sequence, or a linear function; and
the deterministic function provides predetermined PRT locations for the set of PRT locations with the PRT sequence.

17. The user equipment of claim 12, further comprising a processor configured to determine that the set of first data tones corresponds to a first transmission power and the set of second data tones corresponds to a second transmission power based on one or more entries in the PRTT, wherein the first transmission power is greater than the second transmission power.

18. The user equipment of claim 10, wherein the transceiver configured to receive the resource allocation is further configured to receive, from the base station, a PRT sequence that indicates which tones in the set of transmission tones are designated as the set of PRTs.

19. The user equipment of claim 10, further comprising a processor configured to:
generate the outgoing waveform with the set of transmission tones based on a PRT sequence, the PRT sequence indicating an arrangement of the set of PRT locations relative to the set of data tone locations within the particular bandwidth; and
determine that the set of first data tones corresponds to a first order modulation scheme based on the PRT sequence, wherein the PRT sequence indicates the set of second data tones corresponds to a second order modulation scheme that has an order greater than that of the first order modulation scheme.

20. The user equipment of claim 10, wherein the transceiver configured to receive the resource allocation is further configured to receive, from the base station, modulation and coding scheme (MCS) information for the set of transmission tones.

21. The user equipment of claim 20, wherein the MCS information comprises a second MCS for the set of second data tones,
further comprising:
a processor configured to determine a first MCS for the set of first data tones based on at least a portion of the second MCS.

22. The user equipment of claim 20, wherein the MCS information comprises a first MCS for the set of first data tones and a second MCS for the set of second data tones, wherein the second MCS has a greater order than that of the first MCS,
further comprising a processor configured to:
determine that the set of first data tones corresponds to a first transmission power and the set of second data tones corresponds to a second transmission power based on at least the first MCS, wherein the first transmission power is greater than the second transmission power.

23. The user equipment of claim 10, wherein:
the second subband includes a plurality of physical uplink shared channels (PUSCHs) multiplexed in at least one of time or frequency, and
the transceiver configured to communicate the data transmission is further configured to transmit, to the base station, the data transmission in one or more PUSCHs of the plurality of PUSCHs.

24. The user equipment of claim 10, wherein the transceiver configured to receive the resource allocation is further configured to receive, from the base station, the resource allocation in a radio resource control (RRC) message or in a medium access control (MAC) control element (MAC-CE).

25. The user equipment of claim 10, further comprising a processor configured to:
determine that the set of first data tones corresponds to a first transmission power and the set of second data tones corresponds to a second transmission power based on the resource allocation, wherein the first transmission power is greater than the second transmission power; and
assign the first transmission power to the set of first data tones and the second transmission power to the set of second data tones in the data transmission,
wherein the transceiver configured to communicate the data transmission is further configured to transmit the data transmission with the first transmission power corresponding to the set of first data tones and the second transmission power corresponding to the set of second data tones.

26. A method of wireless communication performed by a base station, comprising:
transmitting, to a user equipment in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and
receiving, with the user equipment in a second subband of the plurality of subbands, a data transmission using an outgoing waveform based at least in part on the resource allocation.

27. The method of claim 26, further comprising transmitting a modulation and coding scheme (MCS) information for the set of transmission tones, wherein:
the MCS information includes a first MCS for the set of first data tones and a second MCS for the set of second data tones; and
the second MCS has an order greater than that of the first MCS.

28. The method of claim 26, wherein a first transmission power corresponding to the set of first data tones is greater than a second transmission power corresponding to the set of second data tones.

29. A base station (BS) for wireless communications, comprising:
    a transceiver configured to:
        transmit, to a user equipment in a first subband of a plurality of subbands, a resource allocation indicating a set of transmission tones comprising a set of first data tones, a set of second data tones and a set of peak reduction tones (PRTs), wherein the resource allocation indicates the set of first data tones overlaps at least a portion of the set of PRTs at respective locations of a set of PRT locations and the set of second data tones is arranged at a set of data tone locations within a particular bandwidth; and
        receive, with the user equipment in a second subband of the plurality of subbands, a data transmission using an outgoing waveform based at least in part on the resource allocation.

30. The base station of claim 29, wherein the transceiver is further configured to transmit a PRT sequence that indicates which tones in the set of transmission tones are designated as the set of PRTs.

* * * * *